US010527645B2

(12) United States Patent
    Walter et al.

(10) Patent No.: US 10,527,645 B2
(45) Date of Patent: Jan. 7, 2020

(54) COMPACT PROBE FOR ATOMIC-FORCE MICROSCOPY AND ATOMIC-FORCE MICROSCOPE INCLUDING SUCH A PROBE

(71) Applicants: CENTRE NATIONAL DE LA RECHERCHE SCIENTIFIQUE, Paris (FR); VMICRO, Villeneuve d'Ascq (FR)

(72) Inventors: Benjamin Walter, Lille (FR); Marc Faucher, Lesquin (FR)

(73) Assignees: VMICRO, Villeneuve d'Ascq (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 15/744,033

(22) PCT Filed: Jul. 12, 2016

(86) PCT No.: PCT/EP2016/066549
    § 371 (c)(1),
    (2) Date: Jan. 11, 2018

(87) PCT Pub. No.: WO2017/012927
    PCT Pub. Date: Jan. 26, 2017

(65) Prior Publication Data
    US 2018/0203037 A1    Jul. 19, 2018

(30) Foreign Application Priority Data

Jul. 22, 2015  (FR) ..................... 15 56945

(51) Int. Cl.
    *G01Q 10/04*    (2010.01)
    *G01Q 60/38*    (2010.01)
    (Continued)

(52) U.S. Cl.
    CPC ........... *G01Q 10/045* (2013.01); *G01Q 20/02* (2013.01); *G01Q 20/04* (2013.01); *G01Q 30/14* (2013.01);
    (Continued)

(58) Field of Classification Search
    CPC ...... G01Q 10/045; G01Q 60/24; G01Q 60/38; G01Q 60/40; G01Q 70/08; G01Q 70/10
    See application file for complete search history.

(56) References Cited

U.S. PATENT DOCUMENTS

| 5,801,472 A | 9/1998 | Wada et al. | |
| 2001/0028033 A1* | 10/2001 | Shimizu | B82Y 35/00 250/309 |

(Continued)

FOREIGN PATENT DOCUMENTS

| WO | 2004/023490 A2 | 3/2004 |
| WO | 2005/121812 A1 | 12/2005 |

(Continued)

OTHER PUBLICATIONS

Clemens T. Mueller-Falcke, "Switchable Stiffness Scanning Microscope Probe," Thesis submitted to MIT, Jun. 2005, XP055273841 <http://dspace.mit.edu/bitstream/handle/1721.1/32349/61493511-MIT.pdf?sequence=2>.

(Continued)

*Primary Examiner* — Eliza W Osenbaugh-Stewart
(74) *Attorney, Agent, or Firm* — Baker & Hostetler LLP

(57) ABSTRACT

A probe for atomic force microscopy comprises a tip for atomic force microscopy oriented in a direction referred to as the longitudinal direction and protrudes from an edge of a substrate in the longitudinal direction, wherein the tip is arranged at one end of a shuttle attached to the substrate at least via a first and via a second structure, which structures are referred to as support structures, at least the first support (Continued)

structure being a flexible structure, extending in a direction referred to as the transverse direction, perpendicular to the longitudinal direction and anchored to the substrate by at least one mechanical linkage in the transverse direction, the support structures being suitable for allowing the shuttle to be displaced in the longitudinal direction. An atomic force microscope comprising at least one such probe is also provided.

22 Claims, 24 Drawing Sheets

(51) Int. Cl.
    *G01Q 70/10*     (2010.01)
    *G01Q 20/02*     (2010.01)
    *G01Q 20/04*     (2010.01)
    *G01Q 30/14*     (2010.01)
    *G01Q 60/40*     (2010.01)
    *G01Q 70/06*     (2010.01)
    *G01Q 60/06*     (2010.01)
    *G01Q 60/22*     (2010.01)
    *G01Q 60/30*     (2010.01)
    *G01Q 60/58*     (2010.01)
(52) U.S. Cl.
    CPC ............ *G01Q 60/38* (2013.01); *G01Q 60/40* (2013.01); *G01Q 70/06* (2013.01); *G01Q 70/10* (2013.01); *G01Q 60/06* (2013.01); *G01Q 60/22* (2013.01); *G01Q 60/30* (2013.01); *G01Q 60/58* (2013.01)

(56) References Cited

U.S. PATENT DOCUMENTS

2002/0124427 A1* 9/2002 Nishimura ............ B82Y 35/00
    33/554
2014/0338074 A1* 11/2014 Aksyuk .................. G01Q 20/02
    850/6

FOREIGN PATENT DOCUMENTS

| WO | 2008/148951 A1 | 12/2008 |
| WO | 2013/051094 A1 | 4/2013 |
| WO | 2013/090887 A1 | 6/2013 |

OTHER PUBLICATIONS

F. J. Giessibl et al., "Exploring the nanoworld with atomic force microscopy," Physics Today, Dec. 2006, pp. 44-50.

T. An et al., "Atomically-resolved imaging by frequency-modulation atomic force microscopy using a quartz length-extension resonator," Applied Physics Letters, vol. 87, (2005), 133114, pp. 1-3.

B. Walter, "Fabrication of high-frequency micro-resonators for atomic force microscopy on biological objects," Thesis defended at Lille University of Science and Technology, Dec. 13, 2011.

S. Tallur et al., "Partial Gap Transduced MEMS Optoacoustic Oscillator Beyond Gigahertz," Journal of Microelectromechanical Systems, vol. 24, No. 2, Apr. 2015, pp. 422-430.

K. Karrai et al., "Piezoelectric tip-sample distance control for near field optical microscopes," Appl. Phys. Letters, vol. 66, No. 14, Apr. 3, 1995, pp. 1842-1844.

* cited by examiner

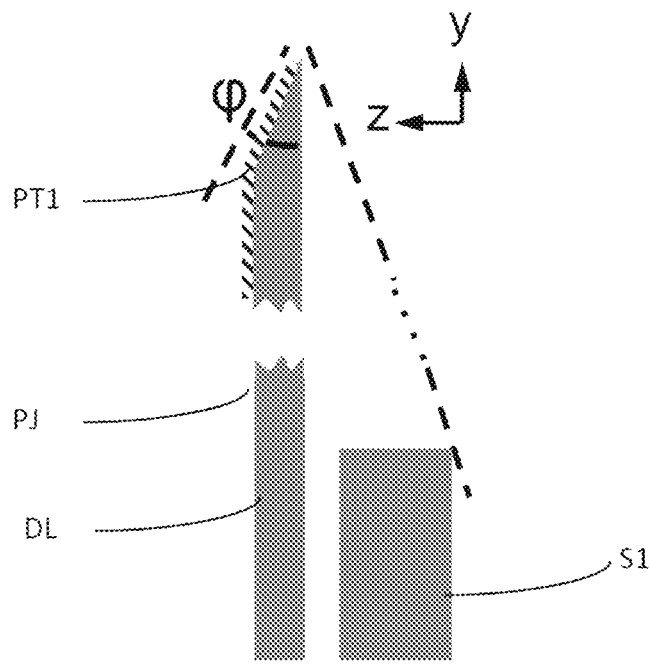
Fig. 1C
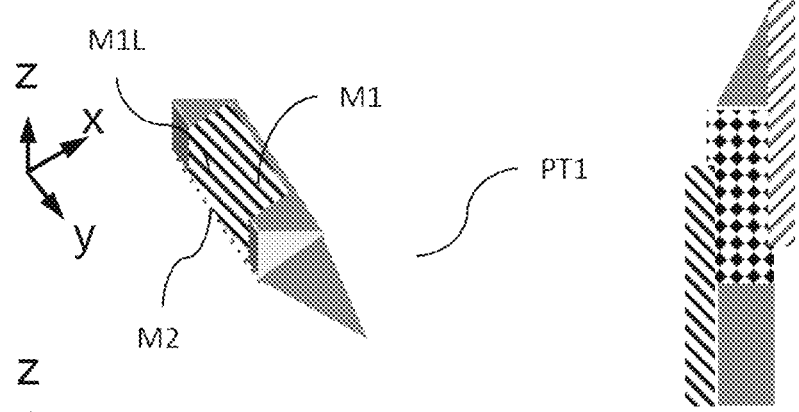
Fig. 2B
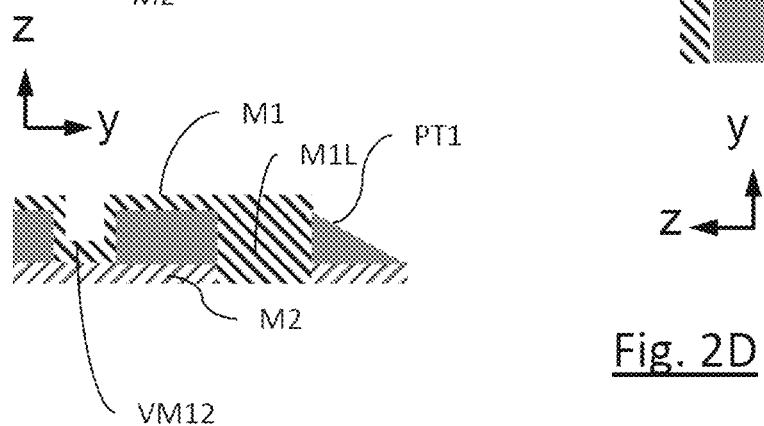
Fig. 2C
Fig. 2D

COMPACT PROBE FOR ATOMIC-FORCE MICROSCOPY AND ATOMIC-FORCE MICROSCOPE INCLUDING SUCH A PROBE

CROSS-REFERENCE TO RELATED APPLICATIONS

This application is a National Stage of International patent application PCT/EP2016/066549, filed on Jul. 12, 2016, which claims priority to foreign French patent application No. FR 1556945, filed on Jul. 22, 2015, the disclosures of which are incorporated by reference in their entirety.

FIELD OF THE INVENTION

The invention relates to a probe for atomic force microscopy and to an atomic force microscope comprising at least one such probe.

BACKGROUND

Atomic force microscopy (or AFM) is a scanning microscopy technique that was developed at the beginning of the 80s and makes it possible to achieve a resolution on the scale of individual atoms. Unlike scanning tunneling microscopy, atomic force microscopy is not limited to forming images of conductive surfaces, thereby making it suitable for insulating materials, semiconductors or even biological samples. This technique finds application in numerous fields of pure and applied research, as well as in the microelectronics industry. A general introduction to the principles of AFM is provided by the article by F. J. Giessibl and C. F. Quate "*Exploring the nanoworld with atomic force microscopy*", Physics Today, December 2006, pages 44-50.

The main component of a conventional atomic force microscope is a probe that consists of a cantilever that is fixed at one end and provided at the opposite end with a tip oriented toward the surface of the sample to be observed. The length of the cantilever is generally of the order of a few tens or hundreds of micrometers, and the tip has a radius of curvature of a few tens or hundreds of nanometers. Such a probe, which generally consists of monocrystalline silicon or silicon nitride, may be fabricated by means of conventional photolithographic techniques, and at low cost. When the tip of the probe is brought close to a surface, it is subject to attractive or repulsive chemical, van der Waals, electrostatic and/or magnetic forces. By measuring these forces while the tip scans the surface of the sample to be observed, it is possible to reconstruct an image of the latter. The forces exerted between the tip and the sample may be measured in various ways. According to the oldest and simplest technique (static AFM), these are limited to observing, in particular through optical means, the deflection of the cantilever bearing the tip.

Improved sensitivity may be obtained by vibrating this cantilever in one of its natural bending modes, and by observing the variations in resonant frequency generated by the gradients of these forces (dynamic AFM). In practice, the dynamic technique is generally preferred for observations made in vacuum or in air. This technique is less suitable for observations in a liquid medium, since the vibrations of the cantilever are heavily damped thereby, which negatively affects the quality factor of the probe.

It is also known practice to employ AFM probes using planar vibration modes—"vertical movement" is also spoken of—which make it possible to achieve very high quality factors even in dynamic AFM mode in viscous media.

For example, the article by Toshu An et al. "*Atomically-resolved imaging by frequency-modulation atomic force microscopy using a quartz length-extension resonator*", Applied Physics Letters 87, 133114 (2005) describes a probe for AFM comprising a micromechanical resonator formed by a quartz beam, held in its medium by a rigid frame that is also made of quartz, which vibrates in an extensional mode. An AFM tip is bonded to one end of this beam, aligned with its longitudinal axis. This resonator exhibits a high quality factor, but also substantial rigidity which greatly limits the amplitude of the vibrations (typically smaller than 1 nm or at most a few nanometers). Additionally, the probe is not produced as one piece, thereby limiting the miniaturization thereof.

The Swiss company SPECS GmbH markets a "KolibriSensor" AFM probe based on this principle.

International application WO 2008/148951 describes a monolithic AFM probe employing a ring- or disk-shaped resonator which oscillates in a volume mode (planar deformation). Such a probe makes it possible to achieve high frequencies, which is favorable for obtaining a high quality factor even when it is used in a viscous medium. In addition, it is less stiff than the probe described by Toshu An et al., and lends itself to greater miniaturization since it can be produced as one piece. However, balancing the masses attached to the resonator—essential for guaranteeing the presence of a mode with a high quality factor—is difficult. Furthermore, it is difficult to add an electrical connection allowing a DC potential or an AC, potentially radiofrequency, signal to be conveyed to the tip. Specifically, the conductive tracks forming such a connection would have to pass through the anchors of the ring-shaped resonator, which are limited in number and which must already bear the tracks required for exciting and detecting the oscillations.

In his thesis "*Fabrication de micro-résonateurs haute fréquence pour la microscopie à force atomique sur des objets biologiques*" ("*Fabrication of high-frequency micro-resonators for atomic force microscopy on biological objects*") defended at Lille University of Science and Technology on Dec. 13, 2011, B. Walter (one of the present inventors) has described an AFM probe comprising a tip attached to the median region of a flexible beam which exhibits two or four points of fixation, which points are located on either side of the tip. The latter is oriented in a direction that is perpendicular to the longitudinal axis of the beam. Producing such a probe is difficult since the mass of the tip interferes with its modes; in addition, it is sensitive to the position of the anchors, which position must be chosen before it is possible to characterize the tip.

In his thesis "*Switchable Stiffness Scanning Microscope Probe*", defended at the Technical University of Darmstadt in June 2005, Clemens T. Mueller-Falcke describes a vertical AFM probe with adjustable stiffness. In this probe, the AFM tip is borne by a longitudinal beam, which is linked to a frame by a hairpin spring and a ring-shaped mechanical resonator; the frame is itself linked to an anchor by hairpin springs. An electrostatic actuator is provided between the anchor and the substrate.

Document U.S. Pat. No. 5,801,472 describes another vertical AFM probe, in which the AFM tip is borne by a longitudinal beam, which is linked to a frame by spring/actuator assemblies that allow the beam to be displaced both in the longitudinal direction and in a transverse direction.

Despite their structural differences, the AFM probes using planar vibration modes known from the prior art share a certain number of drawbacks, in particular their bulk. These bulk constraints are linked to the fact that the AFM tip protrudes relatively little from the planar substrate on which the probe is produced. Stated otherwise, the tip extends from the edge of said substrate over a distance that is very small with respect to the width of the substrate (its largest dimension perpendicular to the tip), but also with respect to its thickness (its smallest dimension perpendicular to the tip). Because of this, the tip must be held substantially perpendicular to the surface of the sample being observed by AFM, which must be planar and smooth: any incline of more than a few degrees, or any irregularity in the surface of more than a few micrometers, will lead to undesirable contact between the substrate of the probe and the sample. This severely limits the possibilities when it comes to studying biological samples (which are generally not smooth) and carrying out simultaneous optical and AFM observations or analyses of one and the same region of a sample.

At first glance, it would appear possible to envisage overcoming these bulk constraints by using longer AFM tips, or tips formed at the free end of long and thin beams. However, this presents considerable difficulties. Specifically, an AFM tip or beam mounted as a cantilever and extending over a relatively substantial length (ten times its width, or even more; typically this corresponds to a few tens or hundreds of micrometers) exhibits parasitic bending modes that are liable to be activated unintentionally and to interrupt the normal operation of the beam. In addition, in the case of a probe of the type described in WO 2008/148951, an overly long- and hence heavy-tip will disrupt the elliptical deformation modes of the ring-shaped resonator.

In the case of the aforementioned article by Toshu An et al., the tip is attached to the end of a beam of considerable length (longer than 1 mm). However, in order to prevent excitation of the bending modes and to facilitate bonding of the attached tip, this beam has a relatively substantial cross section, with dimensions of the order of 100 µm, while the AFM tip protrudes from the beam only by around ten micrometers. Hence it is the longitudinal beam bearing the tip, rather than the frame supporting this beam, that introduces ultimately quite significant bulk constraints.

SUMMARY OF THE INVENTION

The invention aims to overcome the aforementioned drawbacks of the prior art, and more particularly to relieve the bulk constraints in vertical AFM probes.

One subject of the invention, allowing this aim to be achieved, is a probe for atomic force microscopy comprising a tip for atomic force microscopy that is oriented in a direction referred to as the longitudinal direction and protrudes from an edge of a substrate in said longitudinal direction, said tip being arranged at one end of a shuttle that is attached to said substrate at least via a first and via a second structure, which structures are referred to as support structures, wherein said support structures are both anchored to the substrate and are linked to said shuttle at different positions, in said longitudinal direction, of the latter; at least said first support structure extends mainly in a direction referred to as the transverse direction, perpendicular to said longitudinal direction and is anchored to the substrate by at least one mechanical linkage in said transverse direction, the longitudinal and transverse directions forming a plane that is parallel to a main surface of the substrate; and said support structures are deformable (flexible) in the longitudinal direction, allowing the shuttle to be displaced in this same direction.

According to various particular embodiments of the invention:

Said second support structure may be a micromechanical resonator that is suitable for being excited in order to make said shuttle oscillate in said longitudinal direction. More particularly, said micromechanical resonator may be chosen from a ring-shaped resonator and at least one beam that is anchored to the substrate by at least one mechanical linkage and is oriented in said transverse direction.

Said second support structure may also be a flexible structure, extending in said transverse direction and anchored to the substrate by at least one mechanical linkage.

Said probe may also comprise at least one actuator that is configured to bring about a displacement of said shuttle in said longitudinal direction, causing at least said first support structure to bend.

Said probe may also comprise at least one actuator that is configured to bring about a displacement of said shuttle mainly in said transverse direction, causing at least one said support structure to bend.

Said probe may have a monolithic structure, at least said shuttle and said support structures being produced in a surface layer, referred to as the device layer, which is located above a surface of said substrate.

The shape of said shuttle may be elongate in said longitudinal direction and protrude from said edge of the substrate. Additionally, said first support structure may be at least partly suspended above said edge of the substrate. Furthermore, the first support structure may be attached to the substrate via anchors that are themselves at least partly suspended above said edge of the substrate.

Said probe may also comprise at least one conductive track linking an interconnect pad, deposited on said substrate, to said tip for atomic force microscopy, by passing through one said support structure and through said shuttle. Such a probe may also comprise two elements that are positioned on either side of the support structure bearing said conductive track, said elements bearing respective conductive tracks, forming a planar waveguide with the conductive track passing through said support element.

As a variant, the probe may comprise two elongate structures, referred to as lateral beams, extending in said longitudinal direction on either side of the shuttle, both said shuttle and said lateral beams bearing conductive tracks forming a planar waveguide.

Said probe may also comprise a structure extending beyond said edge of the substrate in a direction that is oblique in the direction of said atomic force microscopy tip, said structure bearing an element chosen from a planar waveguide and a microfluidic channel.

Said shuttle may bear, in proximity to or in correspondence with said tip for atomic force microscopy, a resistive element, the ends of which are linked to two interconnect pads that are deposited on said substrate by respective conductive tracks passing through said first support structure and through said shuttle.

Said probe may include a thermo-optical actuator comprising a planar optical guide section that is rigidly connected to said shuttle and extends in said transverse direction, as well as at least one planar optical guide that is arranged on the surface of said substrate and configured to inject light into said planar optical guide section in a generally longitudinal direction.

Said probe may also comprise a motion sensor including a planar optical guide section that is rigidly connected to said shuttle and extends in said transverse direction, as well as two planar optical guides that are arranged on the surface of said substrate and are optically coupled to the opposite ends of said optical guide section, the strength of the coupling depending on the position of the optical guide section in said longitudinal direction.

As a variant, said probe may include a motion sensor including an optical resonator that is rigidly connected to said shuttle, as well as at least one planar optical guide that is rigidly connected to the substrate and coupled by evanescent wave with said optical resonator, the strength of the coupling depending on the position of the shuttle, and hence of the optical resonator, with respect to said planar optical guide, in said longitudinal direction.

The shape of at least one said support structure may be elongate with hairpin turns.

Another subject of the invention is an atomic force microscope comprising at least one such probe. This microscope may also comprise a light source that is configured to generate a light beam directed toward a region of the surface of a sample that is interacting with the tip for atomic force microscopy of said probe; and a system for detecting the light of said beam that is scattered through interaction with the surface of said sample and said tip. As a variant or in addition, this microscope may also comprise a conductive tip that is arranged to come into contact with a region of the surface of a sample in proximity to the tip for atomic force microscopy of said probe.

BRIEF DESCRIPTION OF THE DRAWINGS

Other features, details and advantages of the invention will become apparent upon reading the description provided with reference to the appended drawings, which are given by way of example and show, respectively:

FIG. 1C, a detailed side view of the probe of FIG. 1A or 1B, illustrating the concept of angular bulk in a plane perpendicular to that of the substrate;

FIGS. 2B to 2D, three detailed views illustrating various AFM tip structures that may be used for producing the probe of FIG. 2A;

DETAILED DESCRIPTION

Figure 1A:
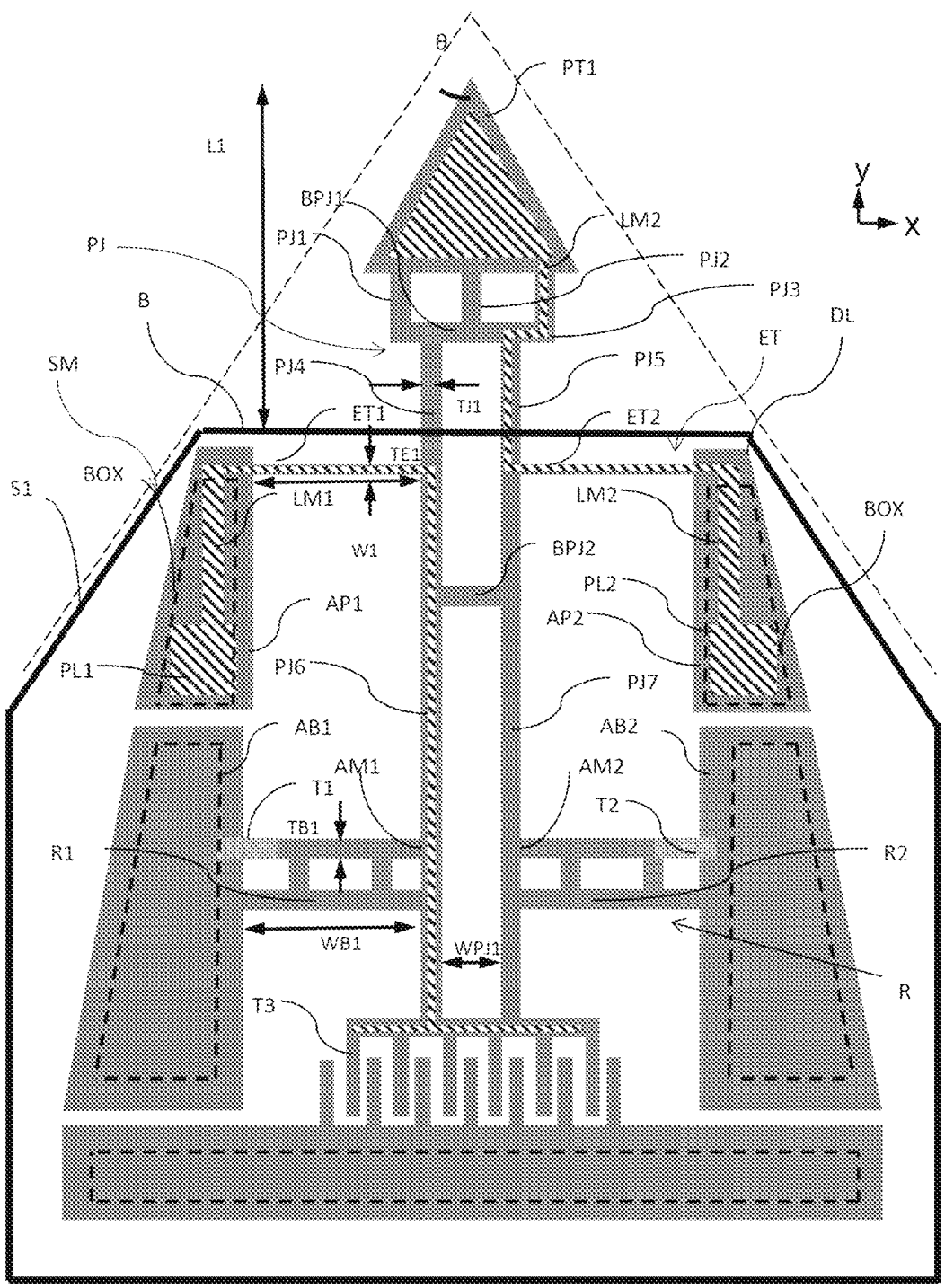
FIG. 1A, a plan view of an AFM probe according to a first embodiment of the invention.

A probe according to the invention is preferably fabricated on the basis of an SOI (silicon-on-insulator) structure, comprising a silicon substrate, denoted by S1 in the figures, in general from 20 µm to 1 mm thick, preferably between 50 and 600 µm thick;

a buried $SiO_2$ oxide layer, the thickness of which is generally comprised between 0.1 µm and 5 µm, preferably between 0.2 µm and 2 µm, denoted by BOX; and a thin layer of silicon (the thickness of which is generally comprised between 1 nm and 100 µm, preferably between 0.25 µm and 5 µm), called the "device layer" and denoted by DL in the figures.

It is also possible to produce the probe on a material other than SOI, for example, SiN deposited on Si. It is also possible to produce some parts of the probe in the DL of an SOI and others in a material such as $Si_3N_4$ or any other material having suitable mechanical properties. In practice, any material having a ratio between its Young's modulus E and its mass density p that is sufficiently high (typically $$\left(\text{typically } 1\frac{\text{km}}{\text{s}} \leq \sqrt{\frac{E}{\rho}} \leq 12\frac{\text{km}}{\text{s}}\right)$$

may be suitable for the implementation of the equation. By way of example, for silicon $$\sqrt{\frac{E}{\rho}} = 9\frac{\text{km}}{\text{s}}$$

and for silicon carbide $$\sqrt{\frac{E}{\rho}} = 12\frac{\text{km}}{\text{s}}.$$

In general, the device layer is located above a surface of the substrate, either directly or by interposing intermediate layers (BOX layers in the case of an SOI structure).

The probes according to the invention may be fabricated by means of entirely conventional technological processes, described for example in the aforementioned thesis of B. Walter. Typically, these processes comprise an anisotropic etching step allowing the components of the probe (beams, resonators, etc.) to be defined in the device layer, where appropriate, etching the substrate via its back face, then an isotropic etching step allowing these elements to be released by removing the oxide linking them to the substrate. The tip, with a radius of curvature of the order of 10 nm, may be obtained by exposing, by means of a suitable etching step, crystal planes of the device layer.

A probe according to the invention comprises an element referred to as a "shuttle" element bearing, at its distal end, an AFM tip extending in the longitudinal direction, beyond an edge of the substrate. The shuttle is borne by at least one first and one second support structure allowing it to move back and forth in the longitudinal direction (hence the term "shuttle") while avoiding the occurrence of parasitic bending modes, thus allowing "vertical" or "planar" operation with less stiffness than if the shuttle itself were made to vibrate in a stretching mode as in the aforementioned article by Toshu An et al.

The longitudinal reciprocating motion of the shuttle may result in the excitation of a resonant oscillation mode of the probe. As a variant, the probe may also be used without being made to resonate; in this case, the shuttle maintains a movement in the longitudinal direction. The support structures may be sized in this case to provide a very low static stiffness (0.01 to 10 N/m, for example 0.5 N/m).

Advantageously, in order to minimize the aforementioned bulk problems, the shape of the shuttle may be elongate in the longitudinal direction—it may for example be a beam, or a structure formed from beams that are aligned in this direction—and it may preferably extend beyond the edge of the substrate. These features are however not essential; as a variant, the shuttle may, for example, take the shape of a ring.

The first support structure is a flexible structure extending mainly in a transverse direction; it may for example be a beam or a structure formed from beams that are aligned in this direction.

The second support structure may be of the same type as the first, or it may be of a different type. It may for example be a micromechanical resonator, in particular a ring-shaped resonator.

In any case, both the first and the second support structures are anchored to the support by at least one mechanical linkage. For example, if they are transverse beams, they may be anchored to the substrate at their ends (or even at a single end) or in correspondence with a node of a bending mode.

One or more transducers are generally provided for exciting and/or detecting the longitudinal oscillation mode (or, more generally, to bring about a longitudinal displacement of the shuttle). However, it is also possible for the probe not to contain transducers sensu stricto. One alternative possibility consists in using a laser to thermally excite the resonator, and another laser to read the mechanical amplitude of the resulting oscillation. It is also possible to position optical guides close to the movable parts in order to inject or to collect the light from these lasers.

Figure 1B:
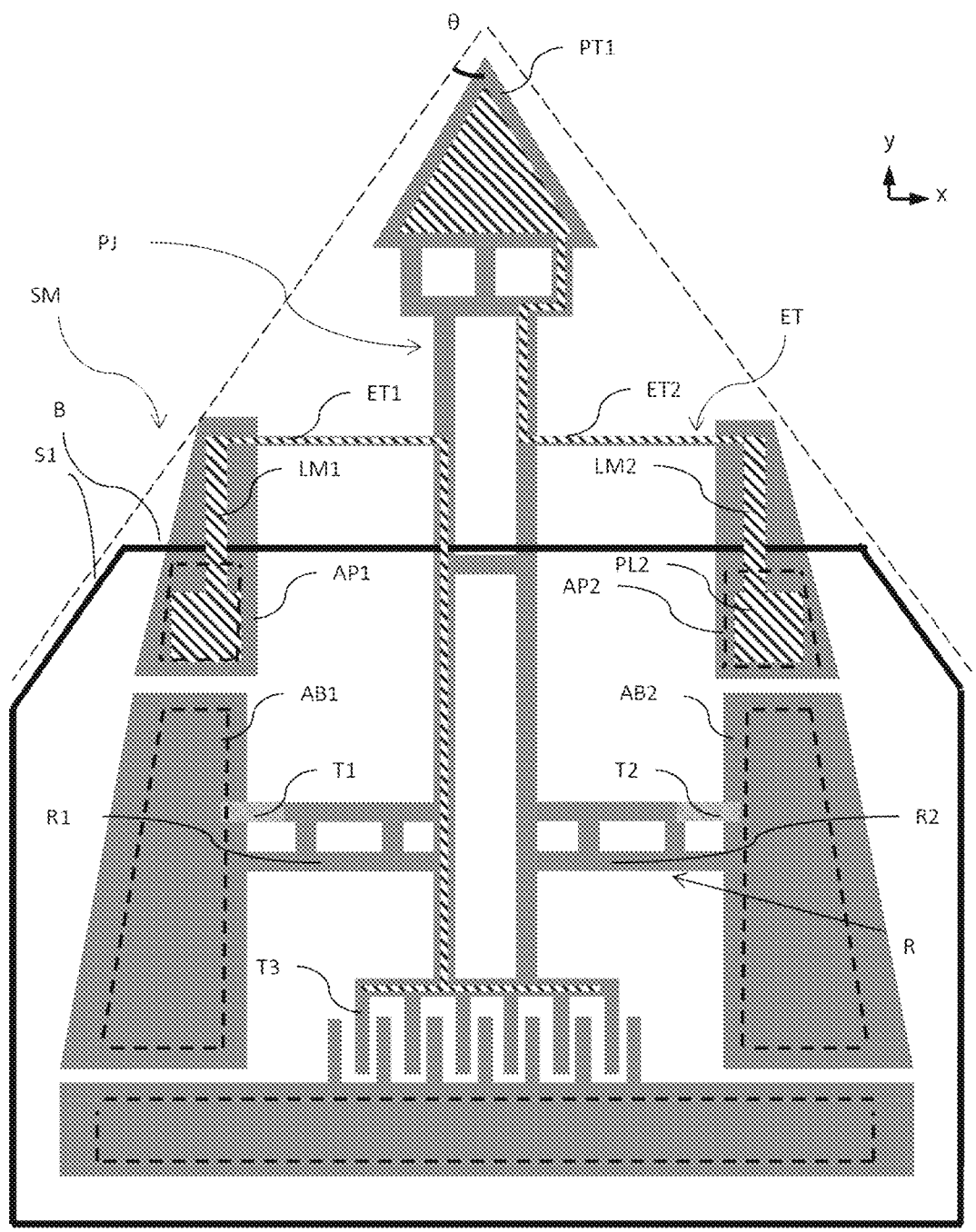
FIG. 1B, a plan view of an AFM probe according to one variant of said first embodiment of the invention.
Figure 2A:
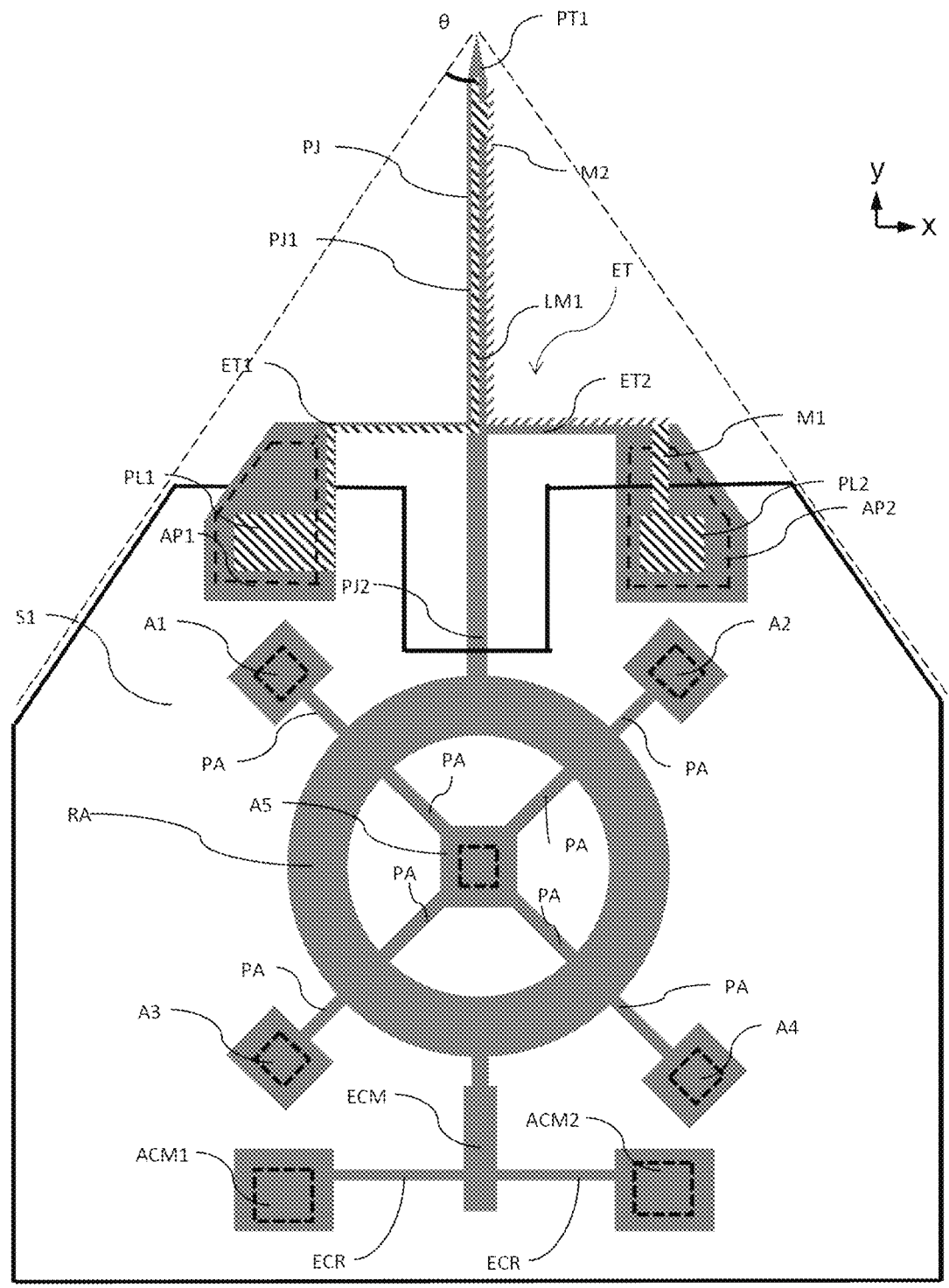
FIG. 2A, a plan view of an AFM probe according to a second embodiment of the invention.

FIG. 1A shows an SM probe according to a first embodiment of the invention. In this and the following figures, the outline of the substrate S1 is represented by a thick black line, the reference B denotes the edge from which the longitudinal beam PJ protrudes; the elements that are etched into the device layer DL are shown in gray and the metallizations that are deposited over these elements are represented by hatched regions. In FIGS. 1A, 1B and 2A only—so as not to overload the other figures—dotted lines represent the oxide layer present below the elements that are etched into the device layer; the oxide is set back with respect to the edges of these elements (and absent below the thinnest elements) since it is attacked in an isotropic etching step, referred to as the releasing step in the field of microelectromechanical systems (MEMS). In all of the figures, the probe extends primarily in a plane x-y (the axis z corresponding to the direction of the thickness of the substrate); the axis y corresponds to what is referred to throughout the application as the "longitudinal direction" and x to the "transverse direction".

The probe of FIG. 1A includes a tip PT1 that is produced as one piece at the distal end (opposite the substrate) of a shuttle taking the shape of a longitudinal beam PJ. The latter is a composite structure, formed by elementary longitudinal beams PJ1, PJ2, PJ3, PJ4, PJ5, PJ6 and PJ7 that are linked by transverse connecting elements BPJ1 and BPJ2. The probe also comprises a first support structure taking the shape of a transverse beam ET—which is formed by two parts ET1 and ET2 of the same length W1 (but the lengths could also be different) and of width TE1—and a second support structure R that also acts as a micromechanical resonator. This second support structure comprises two ladder-shaped sub-assemblies R1 and R2 (two transverse beams linked by crossmembers). It is designed to have at least one vibration mode M0 and a frequency f0 that provides the tip with a movement along y.

The presence of the first support structure in the shape of a transverse beam ET makes it possible to use a shuttle in the shape of a longitudinal beam PJ that is longer than in the prior art (length L1, comprised between the edge of the substrate and the end of the tip, comprised between 50 and 100 μm), and hence to obtain less bulk in the plane xy; this bulk is defined in particular by the angle θ, formed by the two half-lines that start at the end of the tip and that are tangential to the substrate. Preferably, this angle θ may reach or even exceed 45°, thereby allowing, for example, the probe to engage with a sample of high topography.

In the case of FIG. 1A, the resonating element R (R1, R2) prevails over the mechanical stiffness since the support beam ET is of the same length but thinner: TE1<(TB1+TB2). According to the requirements, it is possible to adjust the stiffnesses in the reverse direction or to make them identical. In the case of FIG. 1A, R1 and R2 are two ladder-shaped structures of the same length WB1 that are embedded on the elements AB1 and AB2, which are rigidly connected to the substrate S1. R1 and R2 are rigidly connected to two elementary longitudinal beams PJ6 and PJ7 at points AM1 and AM2 in particular. PJ6, PJ7, PJ4, PJ5, PJ1, PJ and PJ3, as well as BPJ1 and BPJ2, form a joining structure between R1, R2 and the tip PT1. This structure transmits the movement along y of the resonators R1 and R2 near perfectly since it is stiff in this direction. The degree of stiffness could be changed by choosing a high thickness TJ1 for the elementary longitudinal beams PJ6 and PJ7, or by positioning multiple elementary longitudinal beams that are parallel to one another and are linked by "bars" such as BPJ2 (in the case of FIG. 1A, there are two elementary longitudinal beams of the same width TJ1, with a spacing WP1).

The angular bulk constraints mentioned above are addressed by choosing a long length for this joining structure and for the tip.

As mentioned above, the transverse support beam ET (ET1, ET2), which is rigidly connected to the substrate by the anchors AP1 and AP2, makes it possible to maintain a purely longitudinal vibration mode (along y) and to prevent static deformation of the longitudinal beam along z while it is scanning the surface of the sample.

For certain applications, the tip PT1 will preferably have a large area, as is the case in FIG. 1A. The tip could therefore exhibit out-of-plane twisting vibration modes. To avoid these modes or to distance them from the frequency f0, without having to add substantial mass, beams PJ1, PJ2 and PJ3 are used, which mechanically join with the proximal part of the structure (the part close to the substrate).

In addition to preventing the occurrence of parasitic vibration modes despite the length of the longitudinal beam PJ, the transverse support structure ET provides a solution to the problem of electrically addressing the tip PT1 or another part of the resonator. For example, in FIG. 1A, the transverse half-beam ET1 has been used to bear a metal line (or more generally a conductive track) LM1 that electrically connects the electrostatic transducer T3 to a pad PL1, allowing the longitudinal oscillation to be excited at the pad PL1, which pad is used to make an electrical connection to an external device, for example by means of a probe or a microwelded wire. Regarding the half-beam ET2, it is used here to bear a metal line LM2 linking a pad PL2 to the tip. As a variant or in addition, the transport structure and the shuttle could be used for routing a planar optical waveguide, for the purpose of conveying a guided optical signal to the tip.

One considerable advantage of the probe of FIG. 1A with respect to that described in the aforementioned document WO 2008/148951 is that, regardless of the mass of the various elements suspended from the structure, the presence of the fundamental vibration mode M0 in which the structure translates along y is straightforward to obtain. This mode does not depend on the balancing of a distribution of mass and of stiffness as in WO 2008/148951 and if, due to an effect resulting from the fabrication process, the mass of the tip were to change, the mode would still be present with a modified frequency. In the case of WO 2008/148951, there would be a significant decrease in the quality factor Q, or else loss or degeneration of the mode. Additionally, in the case of WO 2008/148951, the ring provides very high static stiffness since it is retained by anchors having high stiffness; it therefore cannot be subjected to static forces without the tip being damaged. In the case of the invention, however, the necessary flexibility is provided by the support structures.

The elements T1 and T2 schematically represent strain transducers that are incorporated on the beam. These could be piezoresistive or piezoelectric. As a variant, T1 and T2 could be used to piezoelectrically or thermally actuate the oscillation mode of the longitudinal beam, and the electrostatic transducer T3, taking the shape of an interdigitated comb, could be used to detect this oscillation. These same transducers may be used to actuate or to detect a non-resonant displacement of the shuttle. Although the case of a comb-shaped electrostatic transducer has been considered here, any other type of capacitive (planar capacitance, interdigitated, etc.) or optomechanical transducer may be used to excite the probe in a vibration mode, or to bring about a non-vibratory displacement thereof.

It may be of interest to note that, in terms of appearance, the structure of the probe of FIG. 1A resembles that of the device described in document WO 2005/121812 A1, "multiaxis capacitive transducer and manufacturing method for producing it". However, this device is an electromechanical feeler rather than an AFM probe. As such:

Its bandwidth is much too low—lower than 10 kHz whereas AFM requires an oscillation frequency of at least 50 kHz;

It is much too big and heavy;

Since it was not designed to be used as a resonator, its parasitic modes are not controlled.

The structure illustrated in FIG. 1A allows the bulk constraints to be relieved only in the plane xy, which constraints are expressed by the angle θ. However, that of FIG. 1B also allows the bulk constraints to be relieved in the plane yz, which constraints are expressed by the angle φ (see FIG. 1C). Preferably, this angle φ could reach or even exceed 45°.

The structure of FIG. 1B differs from that of FIG. 1A in that the anchors AP1 and AP2 of the transverse beam ET are rigidly connected to the substrate S1 only over part of their area, while another part, as well as the transverse beam itself, extends as a cantilever beyond the edge B of the substrate ("partial anchoring"). This is made possible by the fact that, as long as the width used for AP1 and AP2 is sufficient, the protruding part of each anchor exhibits a stiffness in the plane xy that is very high in comparison with that of ET. Thus this anchor, which is imperfect in the general case, at any frequency, turns out to be sufficient as far as the vibration mode of interest at a particular frequency is concerned.

FIG. 2A illustrates a probe according to a second embodiment of the invention, still involving a tip PT1 that is produced as one piece at the end of a shuttle taking the shape of a longitudinal beam in two parts PJ1 and PJ2 (which, this time, does not have a composite structure since the tip at its end is much thinner and lighter) and a first support structure taking the shape of a transverse beam ET (half-beams ET1 and ET2) that is attached to two partial anchors AP1 and AP2, which act as guides while allowing the bulk dictated by the angles θ and φ to be decreased. In this embodiment, the second support structure is a ring-shaped resonator RA, which is capable of achieving a higher frequency than the beam resonator R. This ring is anchored for example on the inside, by means of beams PA that are linked to an unreleased anchor A5 at its center. It is also possible to anchor it on the outside by means of beams PA and anchors A1, A2, A3 and A4. The ring may be used in an elliptical mode (mentioned in WO 2008/148951); in this case it is advantageous to at least partially balance this mode by means of a mass compensation element ECM that is associated with stiffness compensation elements ECR (transverse beams), which are attached to anchors ACM1 and ACM2. By choosing the dimensions of these elements, it is possible to reach similar amplitudes for the two ring portions having displacements along y that are in phase. The transducers are not shown. They could be electrostatic, piezoelectric, thermal, piezoresistive or optomechanical transducers (see for example: S. Tallur, S. A. Bhave, "*Partial Gap Transduced MEMS Optoacoustic Oscillator Beyond Gigahertz*", Journal of Microelectromechanical Systems n° 99, 2014) that are incorporated in proximity to or on the ring. It is possible, instead of a ring, to use a disk or a resonator of any shape.

To electrically interconnect the tip PT1, two metal deposits may be used—one, M1, formed "at the front", on top of the tip and linked to the conductive track LM1, the other, M2, "at the back", on the bottom of the tip, obtained by turning the structure upside down in order to carry out a deposition operation after releasing the longitudinal beam.

The interconnection of these two metal deposits may be obtained by means of a deposit M1L on the side of the longitudinal beam, formed by vaporising metal at an angle with respect to the normal to the substrate (FIG. 2B), by filling a via VM12, made by means of etching before releasing the beam, with metal (FIG. 2C) or by making a region of the beam close to the tip conductive by means of doping (FIG. 2D, in which the doped silicon is identified by a chequered pattern). These various possibilities are shown in FIGS. 2B and 2C.

Figure 3:
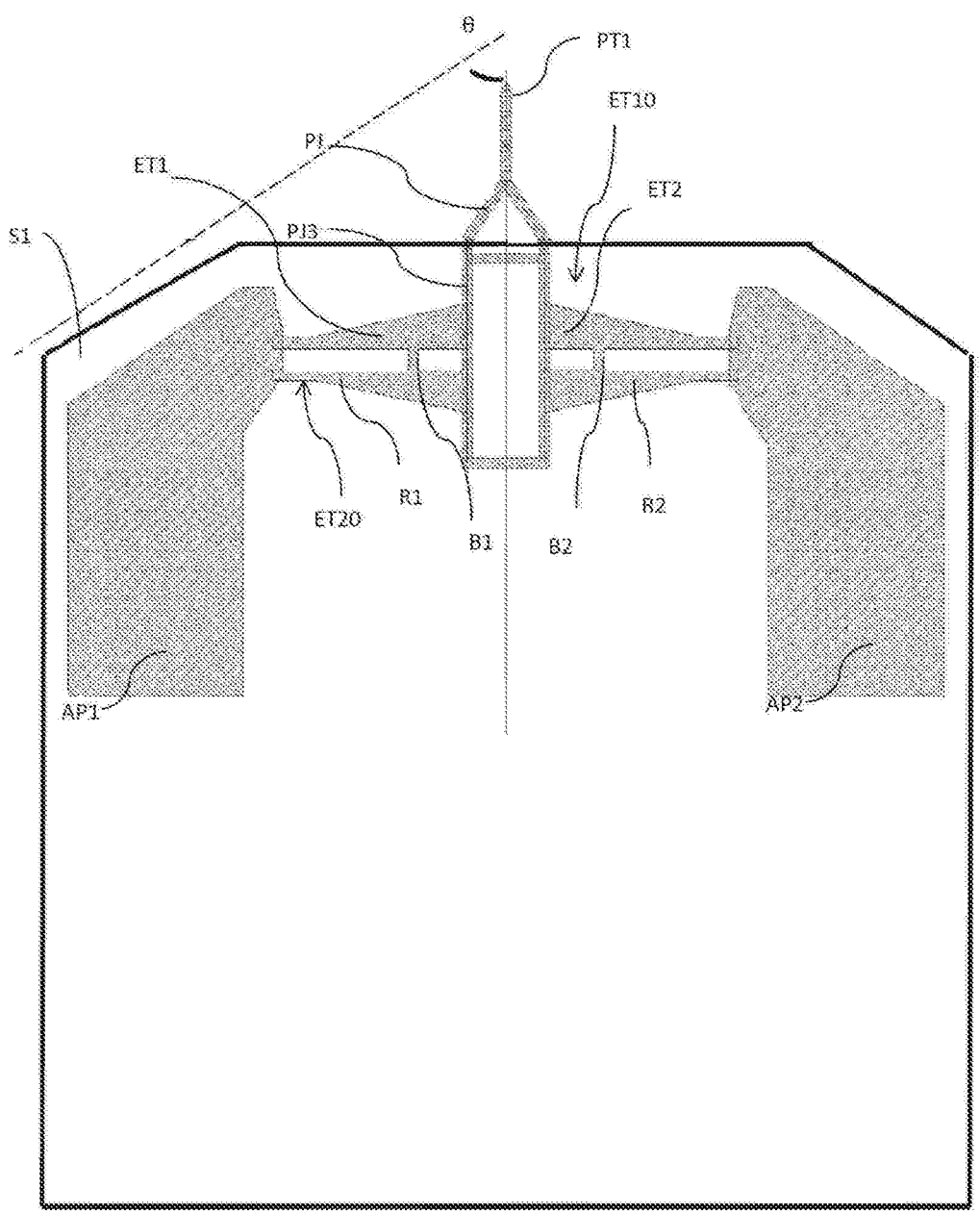
FIG. 3, a plan view of an AFM probe according to a third embodiment of the invention.

The probe of FIG. 3 (third embodiment) is characterized primarily by the fact that the first and the second support structure ET10 and ET20, both taking the shape of a transverse beam having a non-constant cross section, are very close together and are coupled by longitudinal bars B1 and B2. The actuators are not shown. The shuttle PJ takes the form of a rectangular frame with a transverse bar in a center portion.

Figure 4:
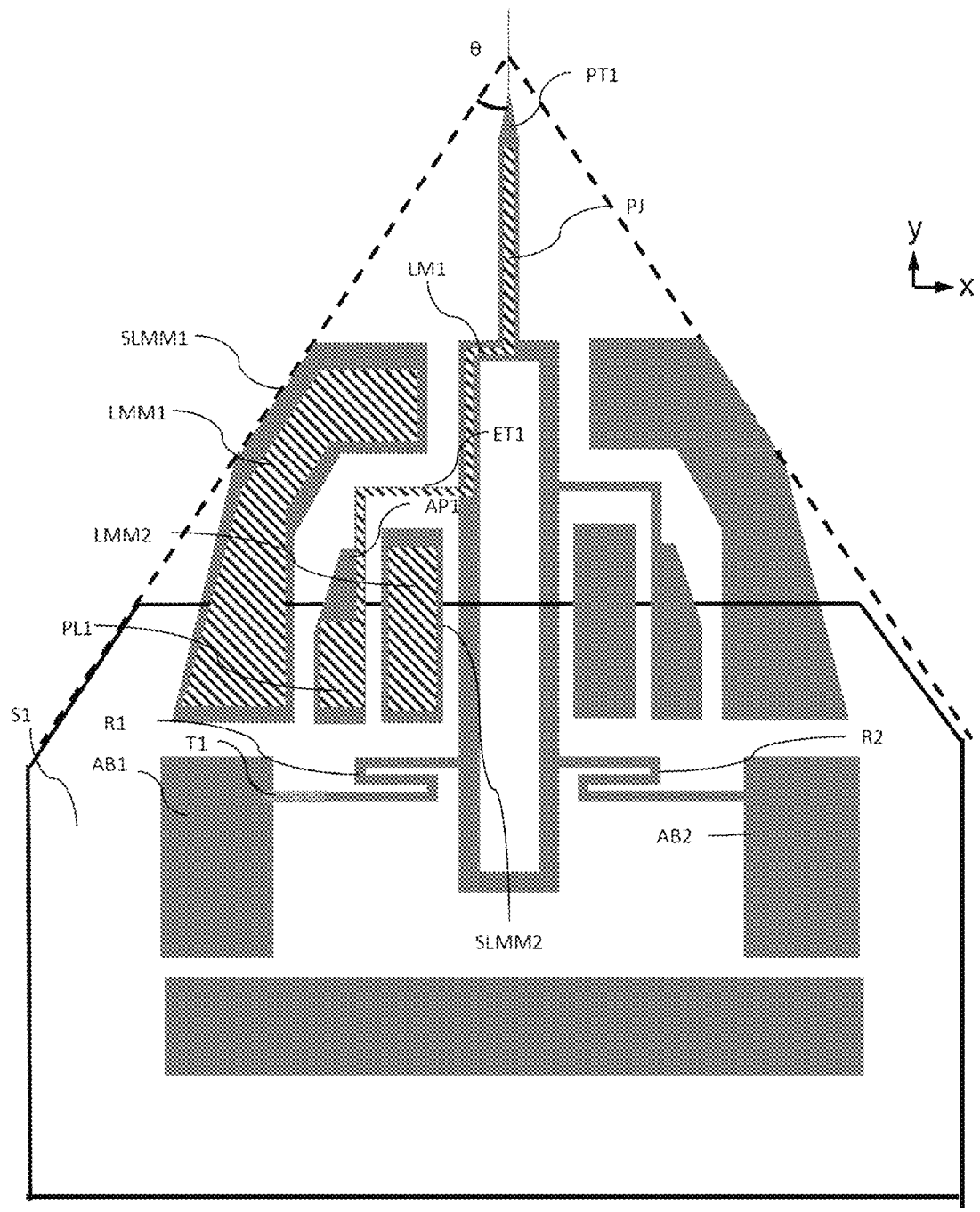
FIG. 4, a plan view of an AFM probe according to a fourth embodiment of the invention.

A probe according to a fourth embodiment is shown in FIG. 4. With respect to the probes described above, two additional features are noted.

First, the presence of two structures SLMM1 and SLMM2 is noted, which structures extend on either side of the first support structure taking the shape of a transverse beam ET (and more particularly of the half-beam ET1 and of its anchor) and bear conductive tracks LMM1 and LMM2 that form, along with the metal line LM1 borne by the half-beam ET1 and extending up to the conductive tip PT1, a planar microwave waveguide of ground-signal-ground type (the structure SLMM1 alone may also be enough if a partial screening of the line LM1 is sufficient). The presence of these structures is made possible by the low bulk in the plane xy. This allows a microwave, or more generally radiofrequency, signal to be applied to the tip and hence be very close to the sample to be studied. Symmetrical structures, but without metallization, are provided on the side opposite the longitudinal beam, for the purpose of balancing.

Next, it may be noted that the two half-beams R1 and R2 forming the second support structure R have hairpin turns, which allow the stiffness thereof to be decreased without increasing length and hence lateral bulk. Transverse beams of this type, shaped like a hairpin or meandering, may also be used in other embodiments of the invention.

Figure 5:
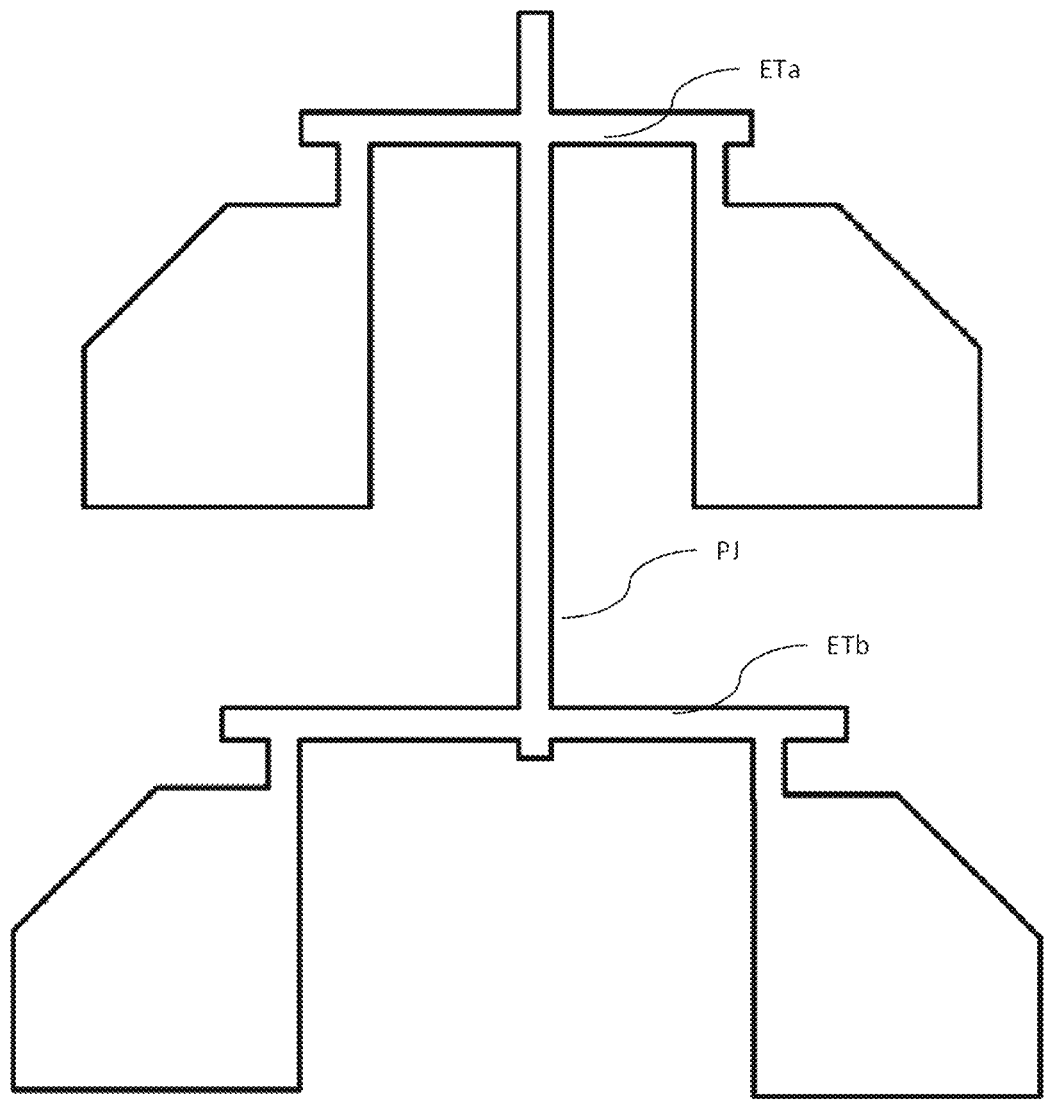
FIG. 5, a plan view of an AFM probe according to a fifth embodiment of the invention.
Figure 6:
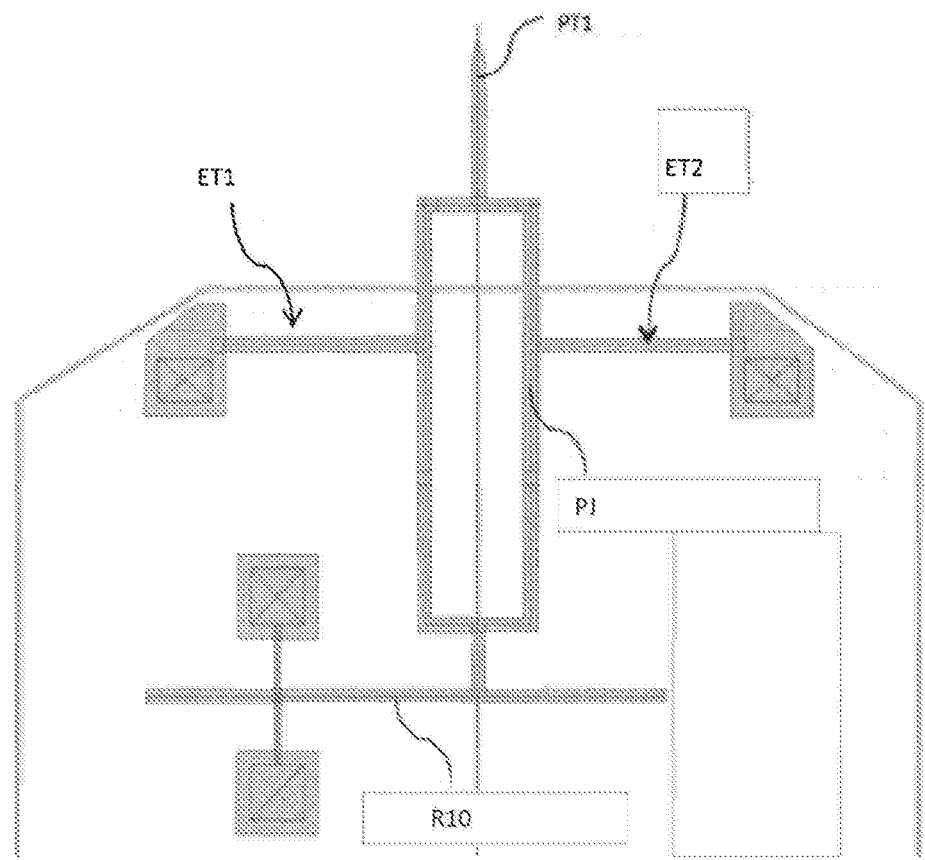
FIG. 6, a plan view of an AFM probe according to a sixth embodiment of the invention.

In the embodiments considered until now, the support structures taking the shape of transverse beams are anchored to the substrate by their opposite ends, and the probe is symmetrical with respect to a longitudinal axis. This is not essential. For example, FIG. 5 illustrates a probe according to a fifth embodiment in which the two support structures, denoted by the references ETa and ETb, are beams that are anchored to the substrate by mechanical linkages at node points of an oscillation mode, other than the ends. Similarly, FIG. 6 illustrates a probe according to a sixth embodiment in which the second support structure R10 is a transverse beam having a single embedded portion located on one side of the probe, which is therefore asymmetrical.

Figure 7A:
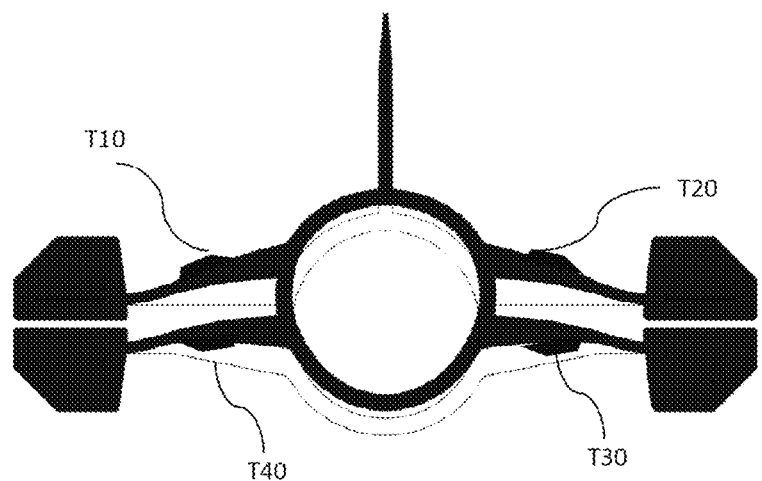
FIGS. 7A and 7B, a plan view of an AFM probe according to a seventh embodiment of the invention.
Figure 7B:
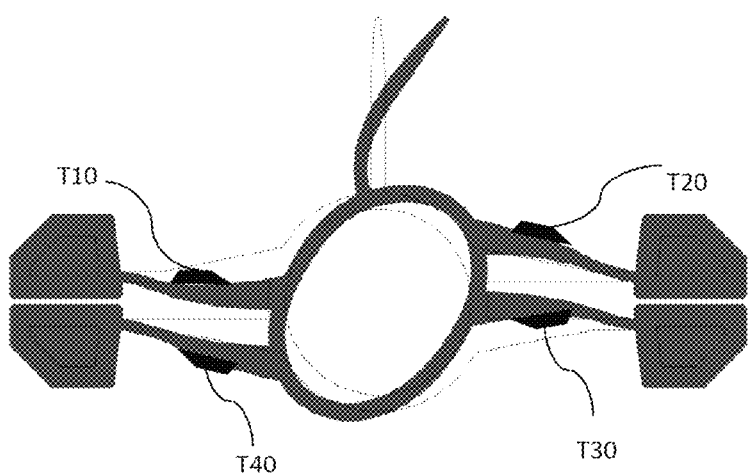
Figure 7C:
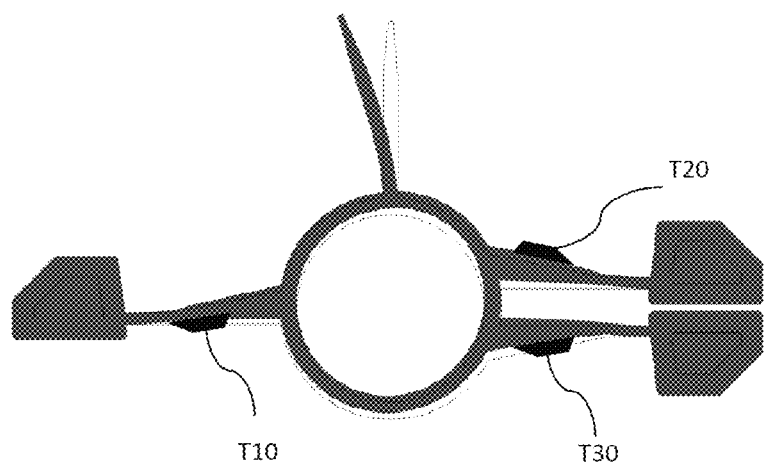
FIG. 7C, a plan view of an AFM probe according to one variant of said seventh embodiment.

In the embodiments considered until now, the probe operates in a vibration mode that imparts an oscillatory movement in a longitudinal direction to the shuttle. However, a probe according to the invention may also be used in a resonant mode that allows the tip to move primarily transversely (in the direction x). This is illustrated in FIGS. 7A-7C, in which the support structures take the shape of beams (or ladders formed from beams) that deform in an in-plane bending mode with substantial degree of flexion in the direction y. In this probe, the shuttle comprises a beam having a length of 12 microns, at the end of which the tip is located along with a ring having an external radius of 7.8 microns. The support structures are 4 trapezoidal beams having a length of 10 microns. This probe has a first vibration mode at 8.6 MHz (it is assumed that a (100)-oriented Si substrate is used). This mode, which brings about a displacement of the tip in the direction y, may be excited for example by any transducer that is capable of generating stresses that are able to produce in-plane bending on at least one of the 4 support beams (in the embodiment of the figure, four piezoelectric transducers T10, T20, T30 and T40 are used). However, the probe has a second vibration mode (FIG. 7B) at 15.5 MHz, in which the tip oscillates mainly in the direction x, the two right-hand support beams then being in phase opposition with the two left-hand support beams. This mode may also be set in motion by exciting, in bending mode, one of the support beams. The probe shown in FIG. 7C has the same dimensions as that of FIGS. 7A and 7B but has one less beam, thereby making the support structures asymmetrical. This results in a vibration mode at 7.7 MHz, at which the displacement of the tip includes a component both along x and along y. In general, the ratio of these components to one another may be chosen by modifying the support structure, and/or the shape of the shuttle.

In this way, it is possible to measure shearing forces between the tip and a sample with which it is interacting; see in this regard the article by K. Karrai et al., Appl. Phys. Lett 66 (14), 1995.

It is also possible, with a probe according to the invention, to benefit from vibration mode engineering not for the purpose of making use of these modes, but rather to avoid them and thus to provide a near-static force measurement with high bandwidth. In particular, a near-static approach—retreat curve may be achieved with a repetition rate that is lower than the frequency of the fundamental mode of longitudinal oscillation (for example 15 MHz). This frequency may be that of an external actuator forming part of the microscope, the transducers incorporated on the probe being used to measure the near-static deflection of the tip in the longitudinal direction (y). In this case, the shuttle is displaced in the longitudinal direction in a reciprocating motion, but it cannot be qualified as an oscillation in a eigenmode of the micromechanical structure since there is no resonance.

Figure 8A:
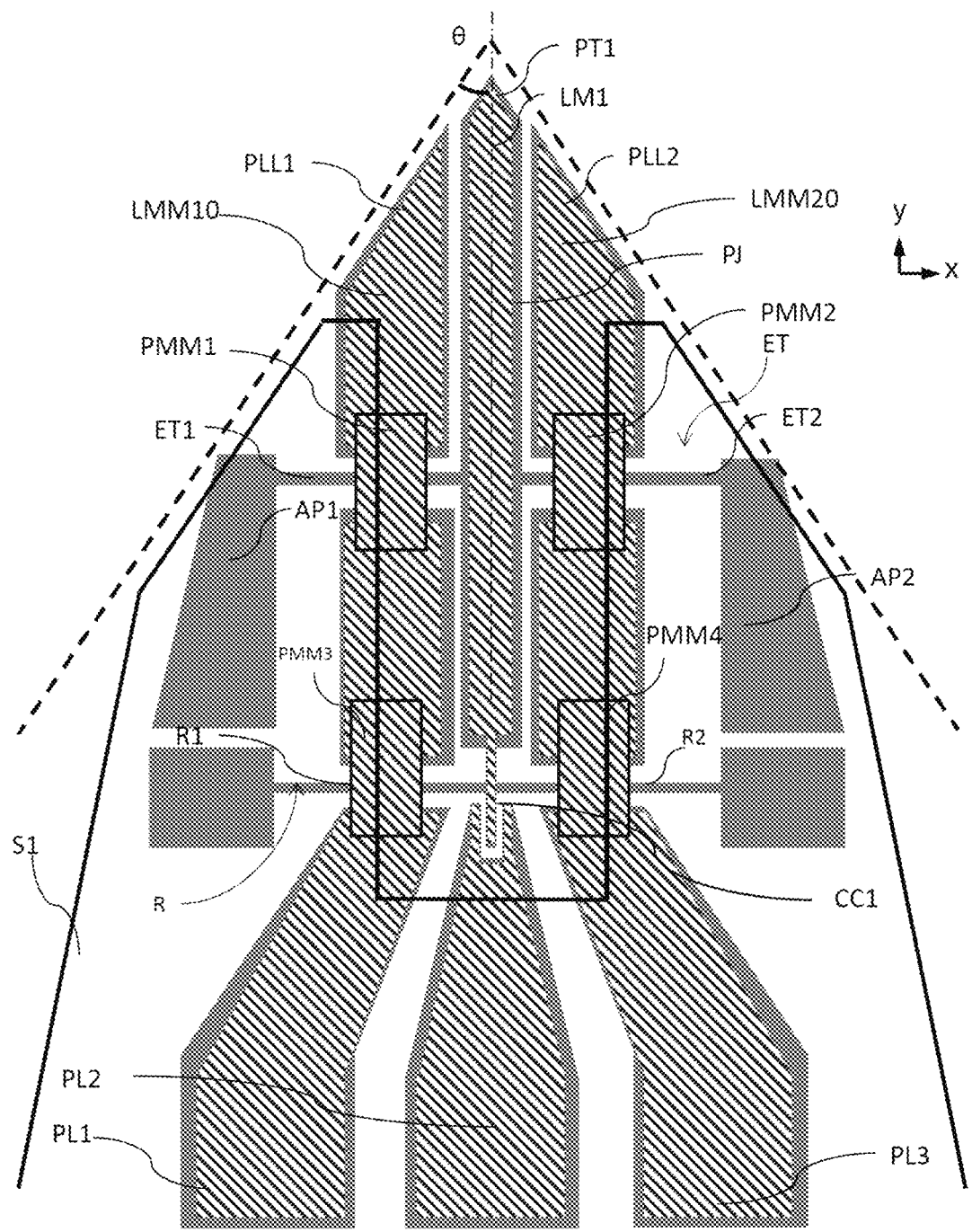
FIGS. 8A to 8C, three plan views of AFM probes according to three variants of an eighth embodiment of the invention.
Figure 8B:
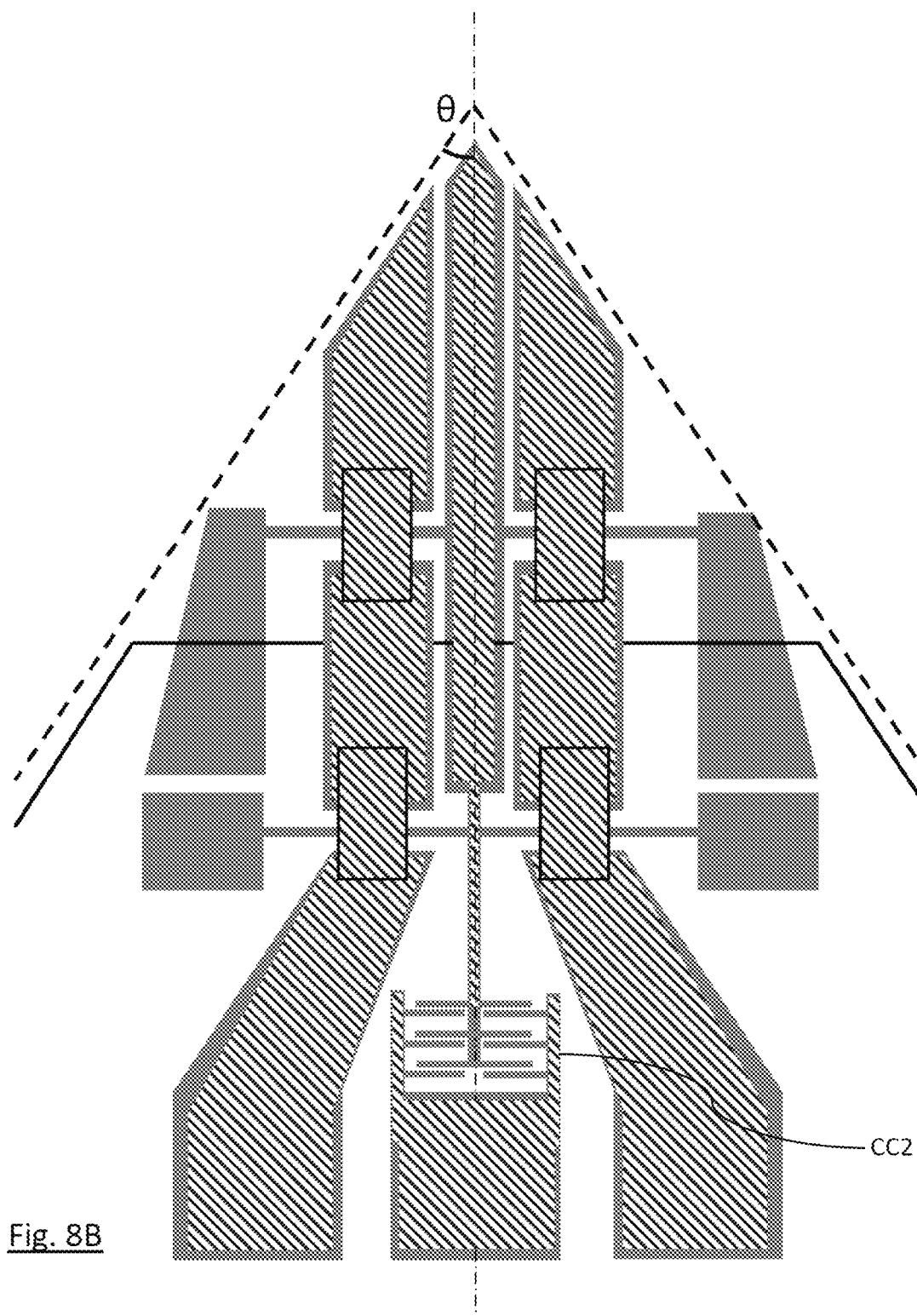
Figure 8C:
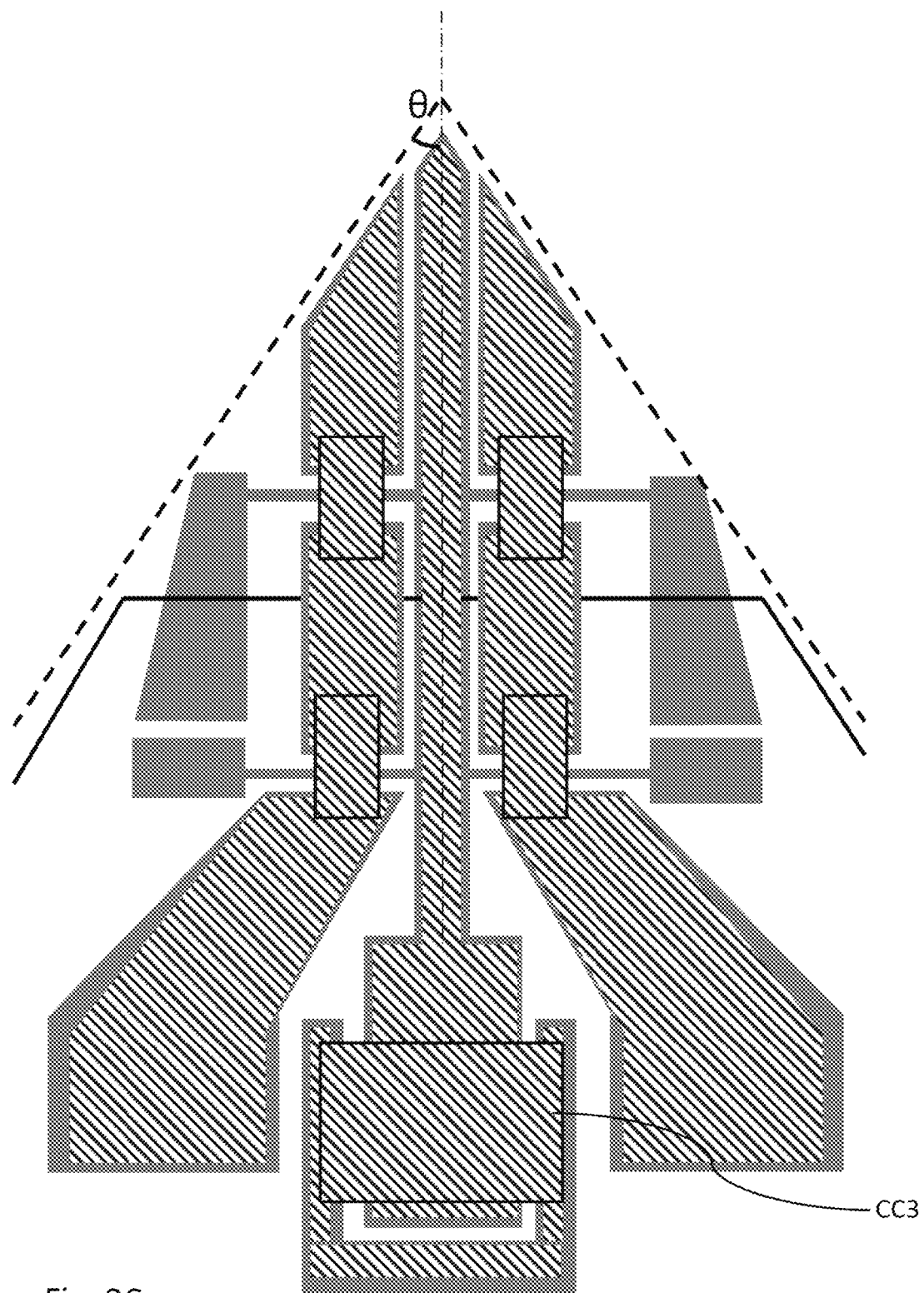

FIGS. 8A to 8C illustrate different variants of a probe according to an eighth embodiment of the invention. This is also probe with a conductive tip, optimized for the propagation of high-frequency signals. Two beams PLL1 and PLL2, referred to as lateral beams, extend longitudinally on either side of the shuttle PJ. They bear two lateral metal lines LMM10 and LMM20 that form, along with the center metal line LM1 borne by the shuttle PJ, a planar waveguide of ground-signal-ground type. The pads PL1, PL2 and PL3 allow the three metal lines to be linked to a microwave or radiofrequency signal generator.

To prevent the lateral metal lines LMM1 and LMM2 from interfering with the oscillation of the shuttle, these lines comprise metal "bridges" PMM1, PMM2, PMM3 and PMM4 that span the transverse support beam ET (ET1 and ET2) and the resonator R (R1 and R2). These bridges are made using conventional "lift-off" or electrolytic deposition techniques. For the same reason, the signal line LM1 must be interrupted at its rear portion (opposite the tip). Thus, the signal is propagated by capacitive coupling. In FIG. 8A, the reference CC1 denotes a coupling capacitor for the signal. In FIG. 8B, the reference CC2 denotes another coupling capacitor, having an interdigitated comb structure. In FIG. 8C, the reference CC3 denotes another coupling capacitor, of planar overlapping type.

As a variant, it is also possible:
- To have a similar structure but with the removal of one of the grounds so as to obtain a two-wire guide; and/or
- To use hairpin beams (cf. R1 and R2 in FIG. 4) and/or to route through the ground around the periphery of the beam anchors so as to avoid having to form bridges; and/or
- To use the silicon of the substrate S1 to have a ground plane under all or part of the center guide and to have a microstrip guide; and/or
- To use an additional metal layer to cover the center conductor with a bridge that is linked to LMM1 and LMM2.
- To use a metal layer on the back face to form a microstrip line over all or part of the path to be traveled by the RF wave.

Figure 9:
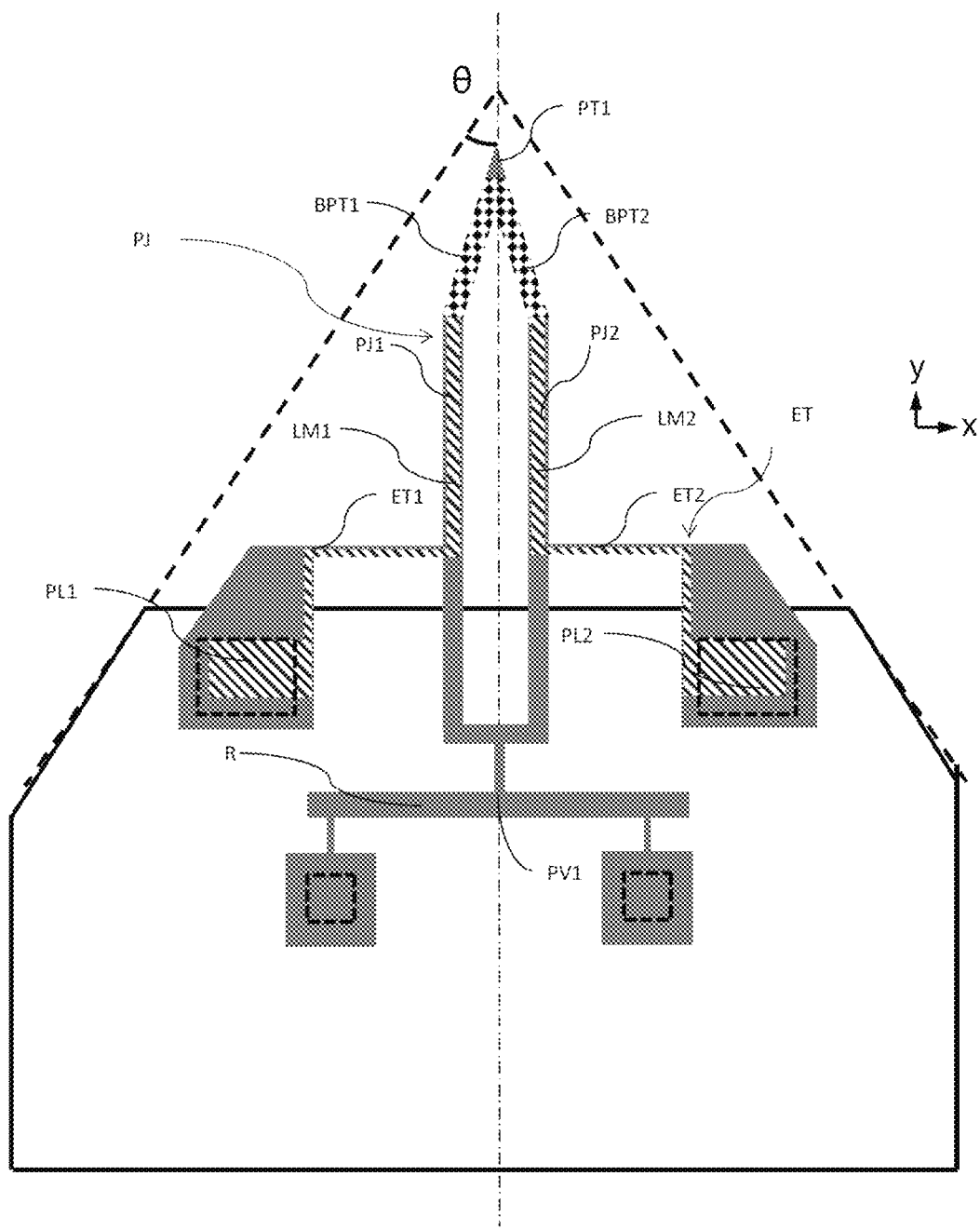
FIG. 9, a plan view of an AFM probe according to a ninth embodiment of the invention.

FIG. 9 illustrates a probe according to a ninth embodiment of the invention. In this probe, the shuttle PJ comprises two mutually parallel longitudinal beams PJ1 and PJ2 that are extended in the distal (positive-y) direction by two converging arms BPT1 and BPT2 that form the tip PT1 where they join. The longitudinal beams PJ1 and PJ2 bear conductive lines LM1 and LM2 that extend up to connection pads PL1 and PL2, which are located on the anchors of the first support structure taking the form of a transverse beam, while passing through the two transverse half-beams ET1 and ET2. Their mechanical separation allows an electrical short circuit to be avoided in the event that high voltages are used. This allows a current to be routed in proximity to or through the tip in order to bring about local heating, for example for scanning thermal microscopy (SThM) applications. To heat the silicon tip PT1, the arms BPT1 and BPT2 may be doped and ohmic contacts may be made with the metal of the line LM1; this makes it possible to have a low access resistance. In FIG. 9, the regions identified by a chequered pattern are doped silicon regions.

The second support structure R is a resonator composed of a beam exhibiting an in-plane bending vibration, which beam is rigidly connected to PJ1 and PJ2 at a ventral point PV1 that is the site at which the highest-amplitude bending motion along the axis y is obtained.

Figure 10:
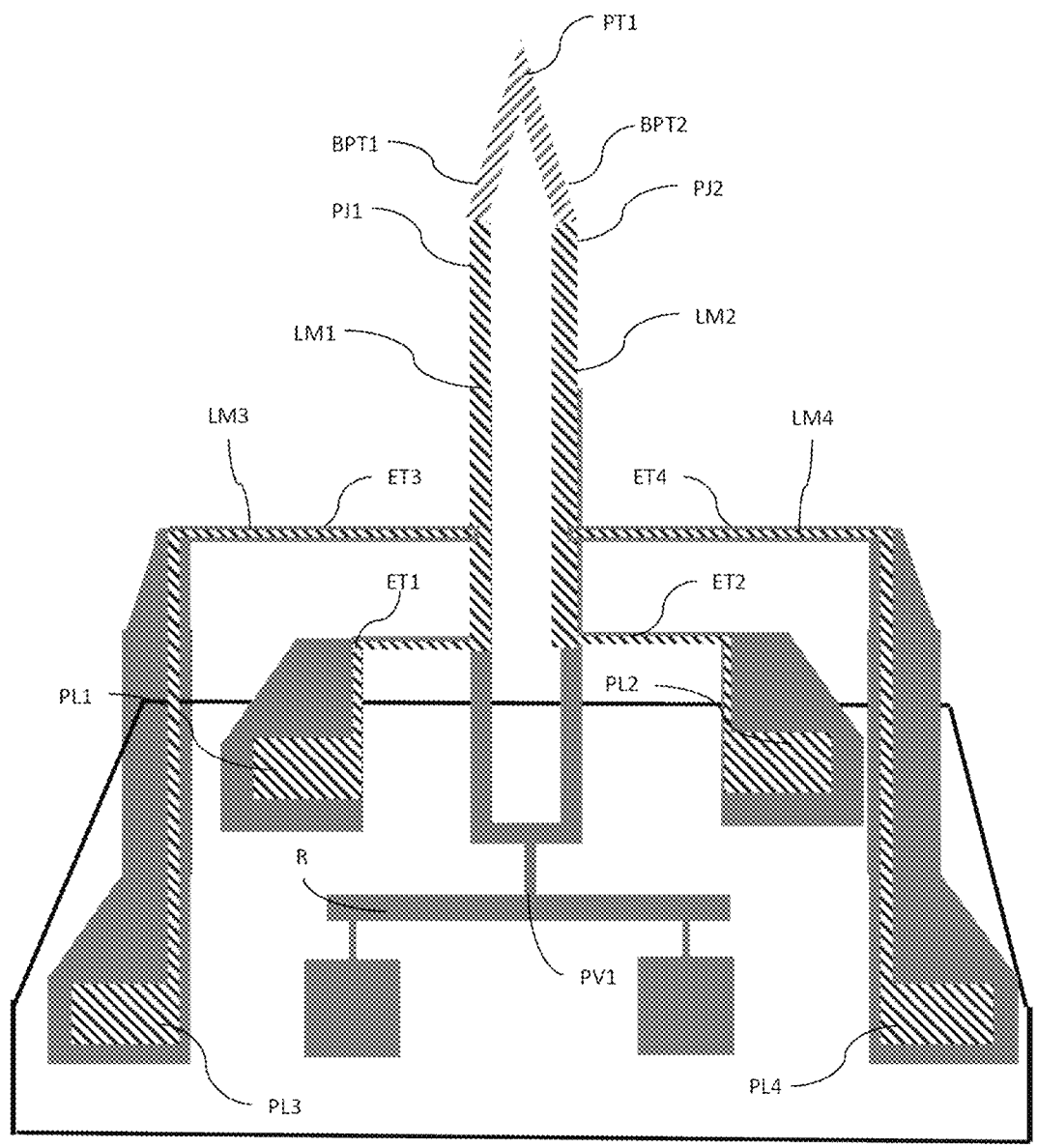
FIG. 10, a plan view of an AFM probe according to a tenth embodiment of the invention.

FIG. 10 illustrates a tenth embodiment, which is in fact a variant of the preceding embodiment, also comprising a second transverse retaining beam ET3 and ET4 bearing metal lines LM3 and LM4 that are linked to pads PL3 and PL4 formed on the anchors. This structure allows a four-point measurement of the integrated resistance on the tip (made of a doped semiconductor or of metal). To achieve this, the current is injected/collected via the pads PL1/PL2 and the potential across the terminals of PL3 and PL4 is measured. The elements ET3 and ET4 do not prevent a mode M0 from being present since they are just as flexible in the plane as ET1 and ET2.

Figure 11:
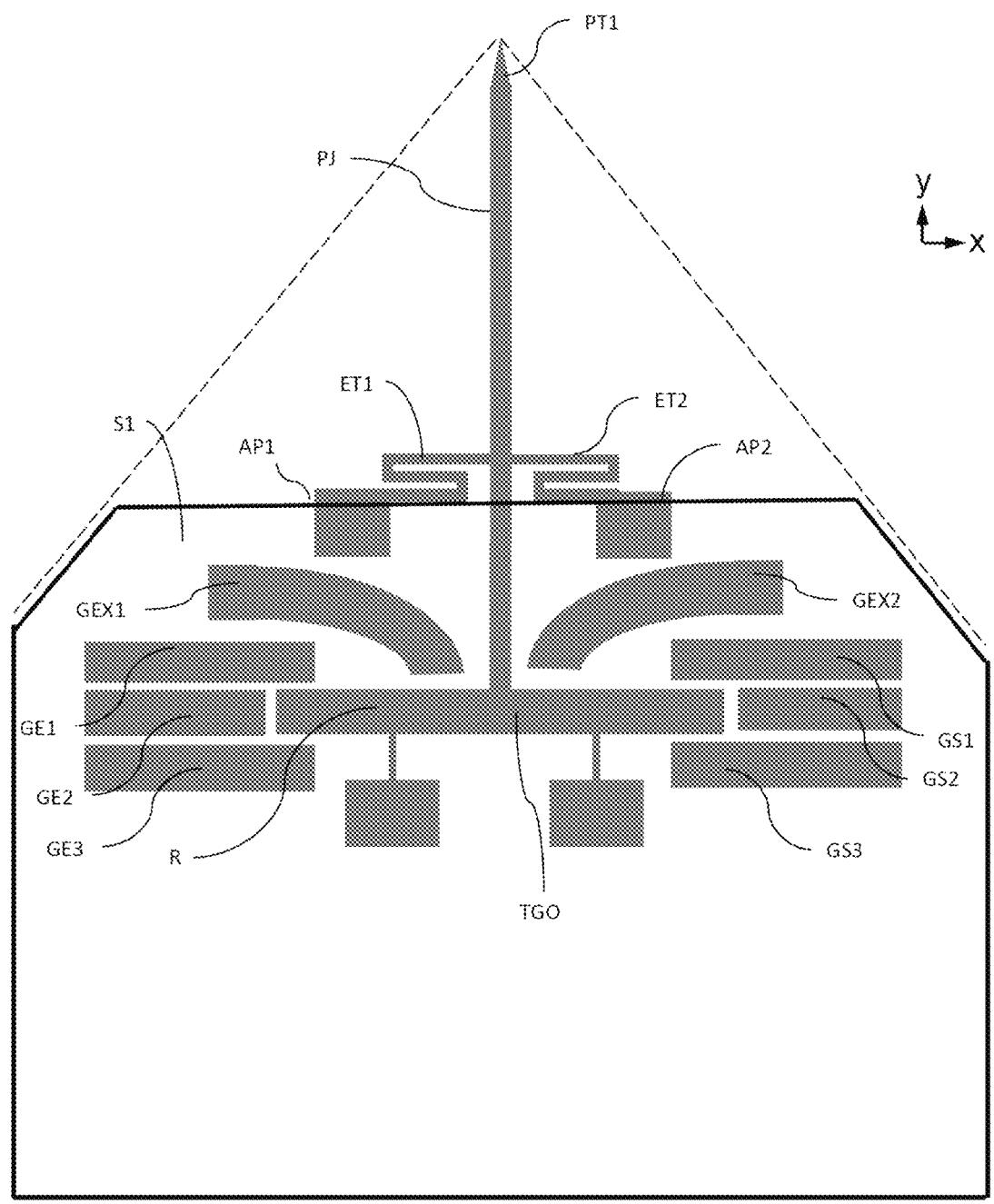
FIG. 11, a plan view of an AFM probe according to an eleventh embodiment of the invention.

In the eleventh embodiment of the invention (FIG. 11), the second support structure is a micromechanical resonator R comprising a planar optical guide section TGO, and is thermo-optically actuated by the injection of optical power into this guide via the planar guides GEX1 and GEX2. The movement is read according to several possibilities based on the injection of light via planar guides GE1, GE2 and GE3 located on one side and it being read by planar guides GS1, GS2 and GS3 located on the other side.

First possibility: the guides GE2, GE3, GS1 and GS2 are not required. The guide GE1 injects light into an end of TGO by evanescent coupling; at the opposite end, a part of this light is collected in GS3, again by evanescent coupling. The strength of the couplings varies with the position of TGO—and hence of the longitudinal beam PJ. It is possible to produce a differential assembly and to measure the difference [Signal(GS1))−(Signal(GS3)].

Second possibility: the guides GE1, GE3, GS1 and GS3 are not required. Light is injected into TGO by direct coupling by means of GE2, and the variation of the signal in GS2 is measured. Here again, the strength of the (direct) couplings varies with the position of TGO—and hence of the longitudinal beam PJ.

Figure 12:
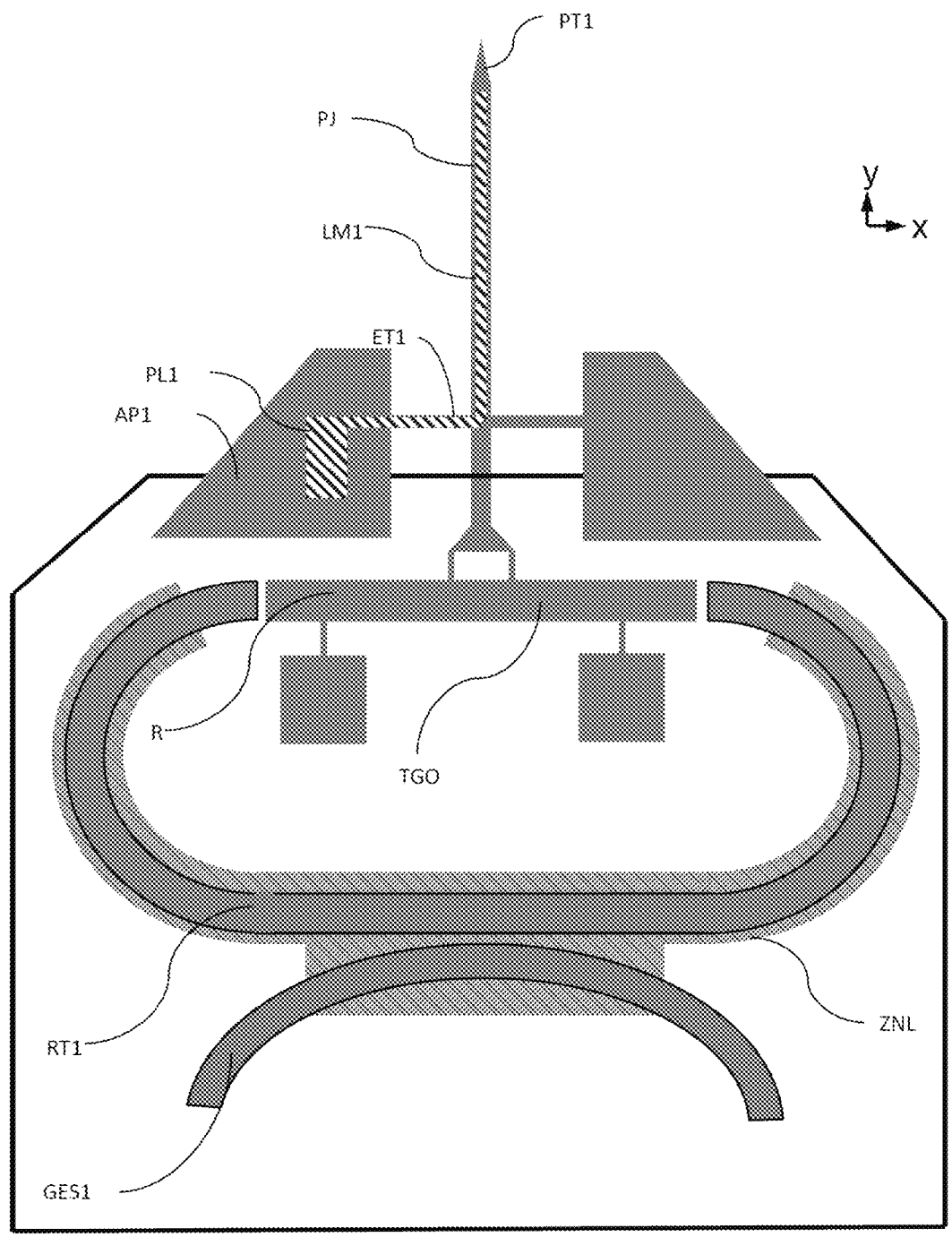
FIG. 12, a plan view of an AFM probe according to a twelfth embodiment of the invention.

FIG. 12 illustrates a twelfth embodiment, which is in fact a variant of the preceding embodiment, in which the light is injected by evanescent coupling from a guide GES1 into a C-shaped guide RT1, which loops the output of R back to the input and forms a pseudo optical resonator ("pseudo" because the losses are quite high). Here again, the losses vary with the position of TGO—and hence of the longitudinal beam PJ.

To provide the best performance levels and technological efficiency, it is possible to proceed such that the part denoted by ZNL is not released (and hence rigidly connected to the substrate). This has no negative effect on the motion M0 of the mechanical resonator. In this embodiment, the tip PT1 is conductive and is linked to a pad PL1 by a line LM1 passing through the transverse beam ET and the longitudinal beam PJ, but this is independent of the optical part.

Figure 13:
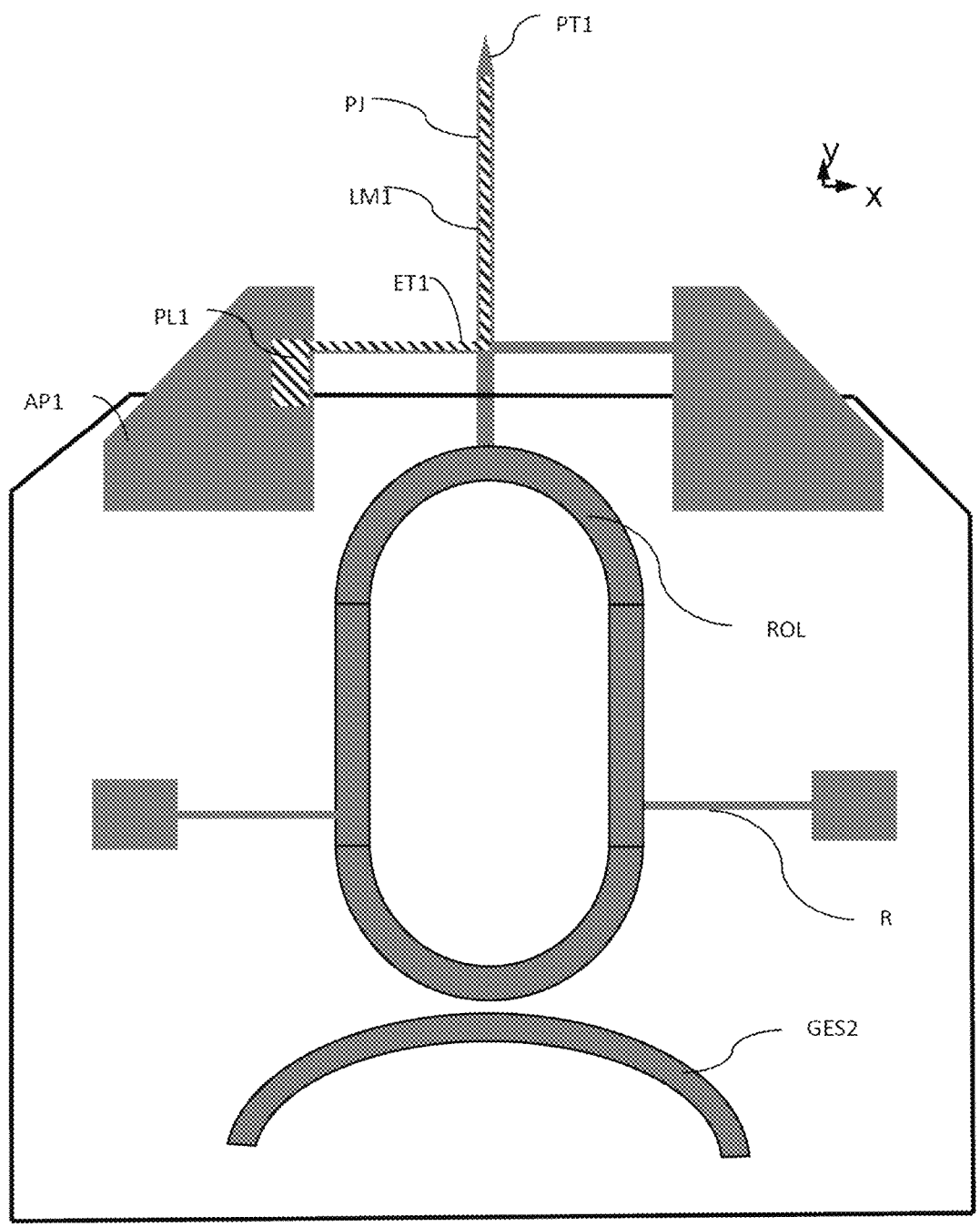
FIG. 13, a plan view of an AFM probe according to a thirteenth embodiment of the invention.

FIG. 13 illustrates a thirteenth embodiment of the invention in which the shuttle includes a released optical resonator ROL taking the form of a looped optical circuit, coupled by evanescent wave with a guide GES2. The displacements of the shuttle bring about a change in the distance between the optical resonator ROL and the waveguide, and hence in the optomechanical coupling. The figure illustrates a ring-shaped optical resonator ROL, but this is not essential; the resonator could also employ Bragg mirrors or be a disk-shaped resonator. The shuttle may also contain only one portion of an optical resonator. The other portion being located in proximity to the shuttle. The displacements of the shuttle bring about a substantial change in the optomechanical cavity formed by the two portions.

In the eleventh, twelfth and thirteenth embodiments, the light sources and detectors may be incorporated within the probe or be separate devices.

In the fourteenth embodiment (FIG. 14), the low bulk of the probe makes it possible to incorporate, on one and the same support, a microwave or radiofrequency planar waveguide GOP, for example having three ground-signal-ground type conductors, extending in an oblique direction in the plane xy, in the direction of the AFM probe, and having a signal conductor (here, the center conductor) that terminates in a tip PT2, which tip is not intended to oscillate but has substantially the same longitudinal position (y-coordinate) as the AFM tip PT1 in its rest state. Such a device may be used for scanning microwave microscopy (SMM) applications.

As a variant, the microwave or radiofrequency waveguide GOP could be replaced by a planar optical guide.

Figure 14:
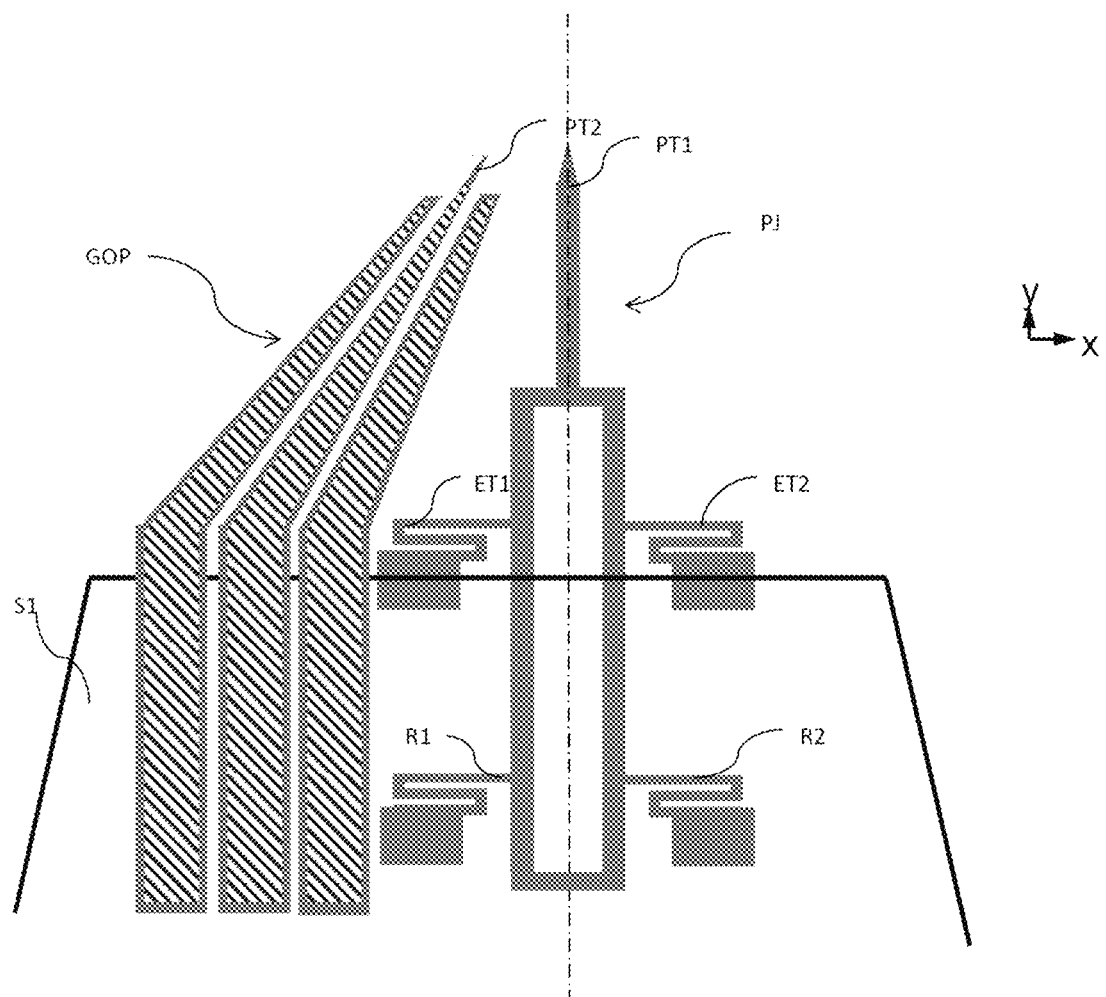
FIG. 14, a plan view of an AFM probe according to a fourteenth embodiment of the invention.

In the particular case of FIG. 14, the elements ET1 and ET2 are meandering or hairpin-shaped beams, which provide the resonator with an even lower lateral bulk while retaining a low degree of stiffness (cf. FIG. 4). R1 and R2 are identical to ET1 and ET2. The longitudinal beam PJ and the tip PT1 are substantially identical to those of FIG. 4, but without a conductive line.

Figure 15:
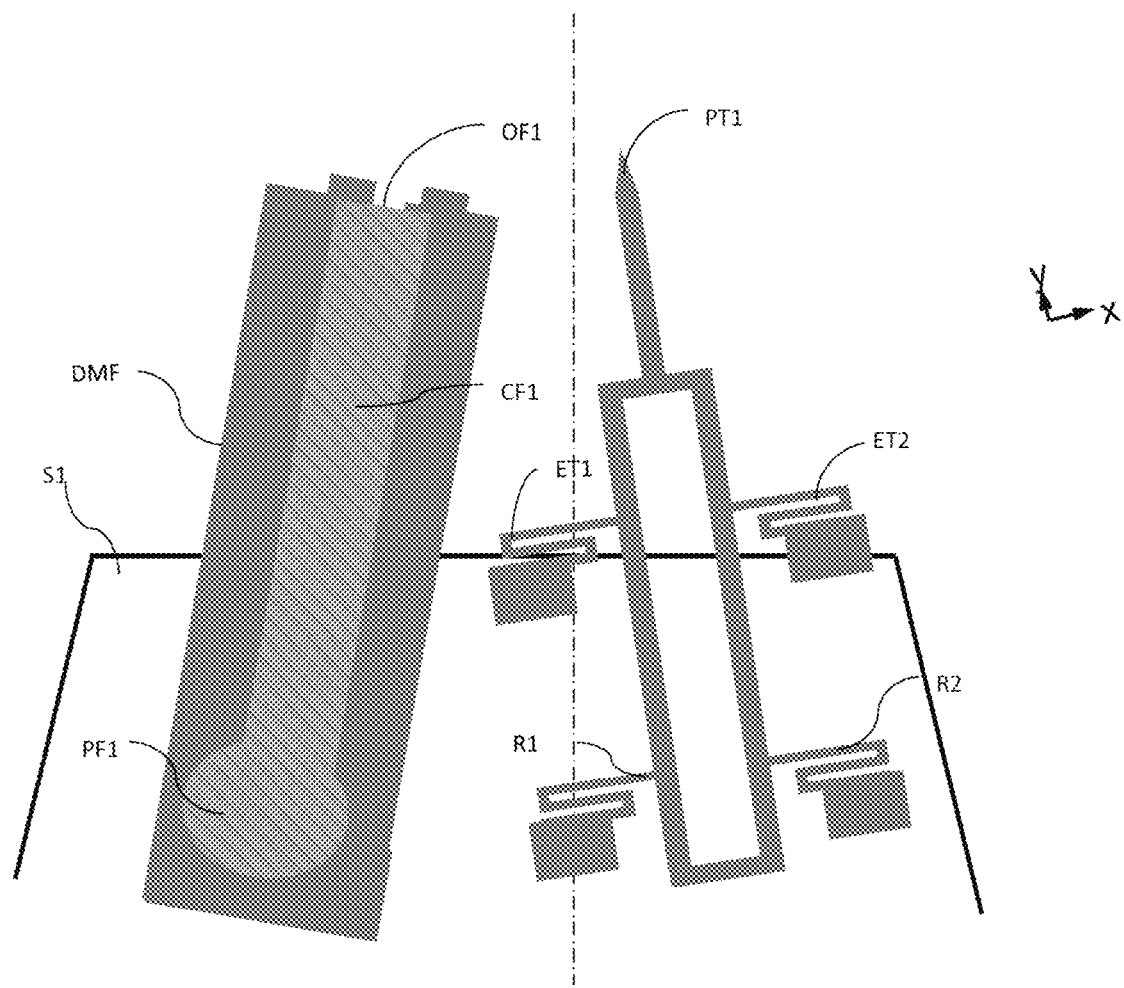
FIG. 15, a plan view of an AFM probe according to a fifteenth embodiment of the invention.

In the embodiment of FIG. 15, the planar waveguide GOP is replaced by a microfluidic device DMF comprising a channel CF1 and a zone allowing connection to the outside world PF1, the overall assembly allowing a fluid to be dispensed via an opening OF1, the position of which is close to the AFM tip PT1. The low bulk of the probe will make it possible to adjust the position of the microfluidic device with respect to the surface. An angle may be provided in order to bring PT1 close to OF1. It is possible to use a plurality of fluidic devices or tips on the same substrate S1. Such a device makes it possible to study chemical reactions in a liquid medium while using very low doses of reagents, for example for biological diagnostic applications.

Figure 16A:
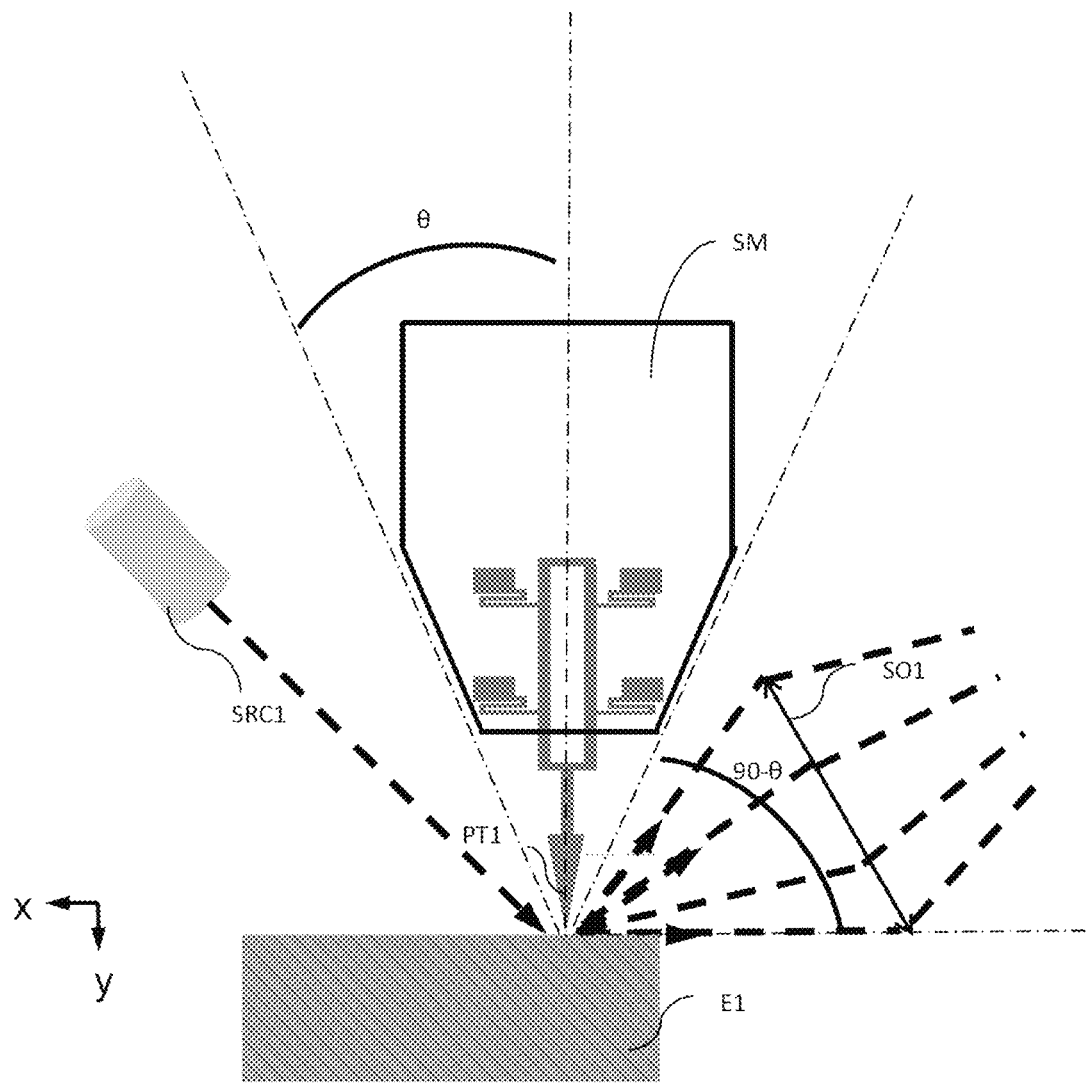
FIGS. 16A and 16B, two representations of the combined use of a probe according to one embodiment of the invention and a light beam illuminating the region of the surface of a sample through interaction with the tip of this probe.

The low bulk of the probes according to the invention allows them to be used in particular in imaging modes involving a light source SRC1 that irradiates the tip PT1 and/or the surface of the sample E1 with which the tip interacts for AFM imaging. In FIG. 16A, the full advantage of having low bulk in the plane (small angle θ) may be seen, allowing an angle (90°−θ) to be left for the purpose of illumination and an angle of the same size to be left for collecting the scattered light by means of a light detection and collection system (shown in the figure by the lens SO1). Such an assembly allows an apertureless scanning near-field optical microscope (SNOM) to be produced, and fluorescence or tip-enhanced Raman spectroscopy (TERS) analyses to be carried out.

Figure 16B:
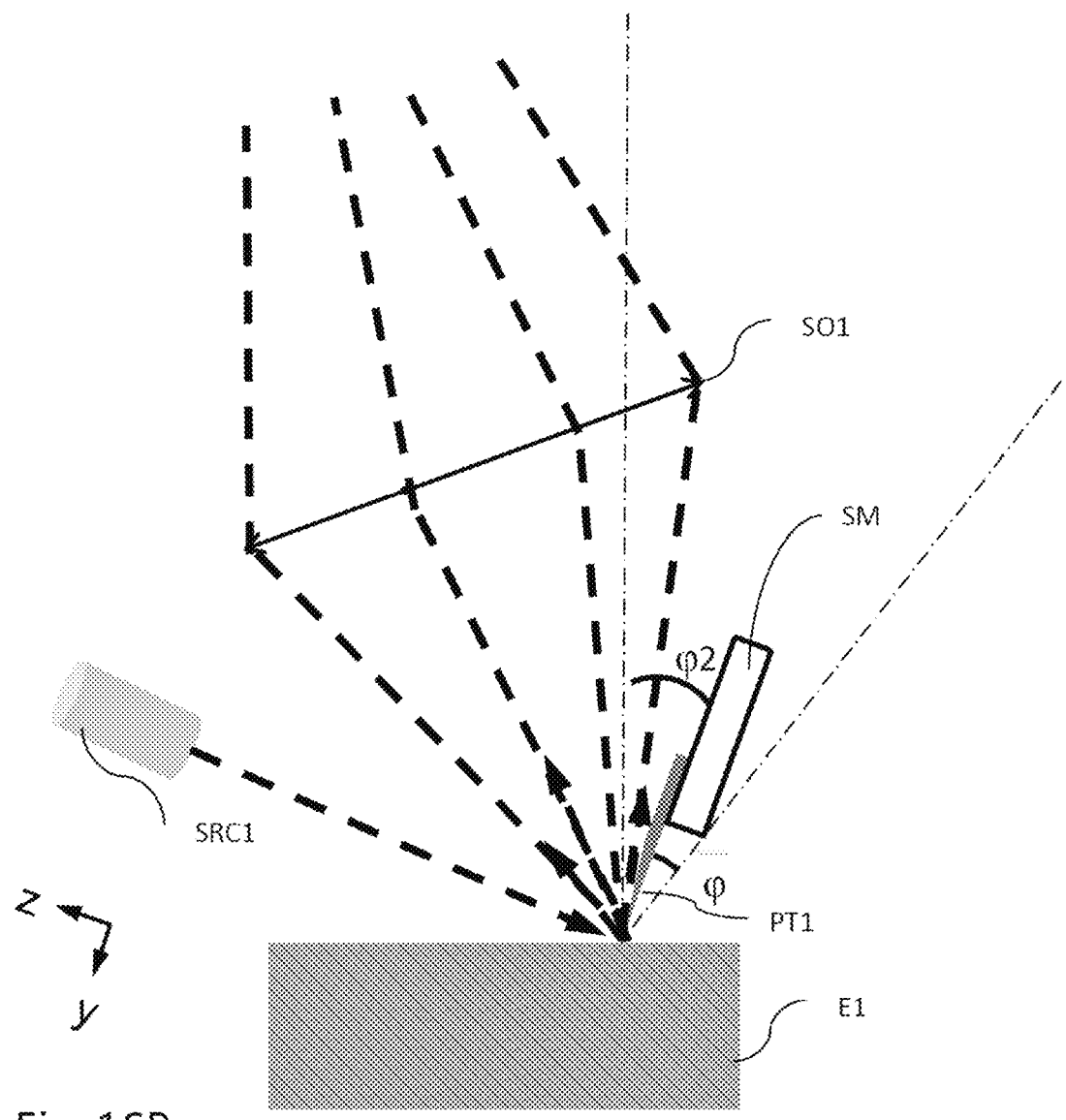

In FIG. 16B, the advantage of having a low bulk in the plane yz may be seen (small angle φ): the smaller φ is, the greater the amount by which the probe may be tilted in the plane yz at an angle φ2. This will allow light to be collected at angles that would be favored by the shape of the tip and the electromagnetic field-surface interaction.

In the examples of FIGS. 16A and 16B, the AFM probe (reference SM) and the light source/detector SRC1/SO1 are the main elements of a device that constitutes both an atomic force microscope and an apertureless scanning near-field optical microscope.

Figure 17:
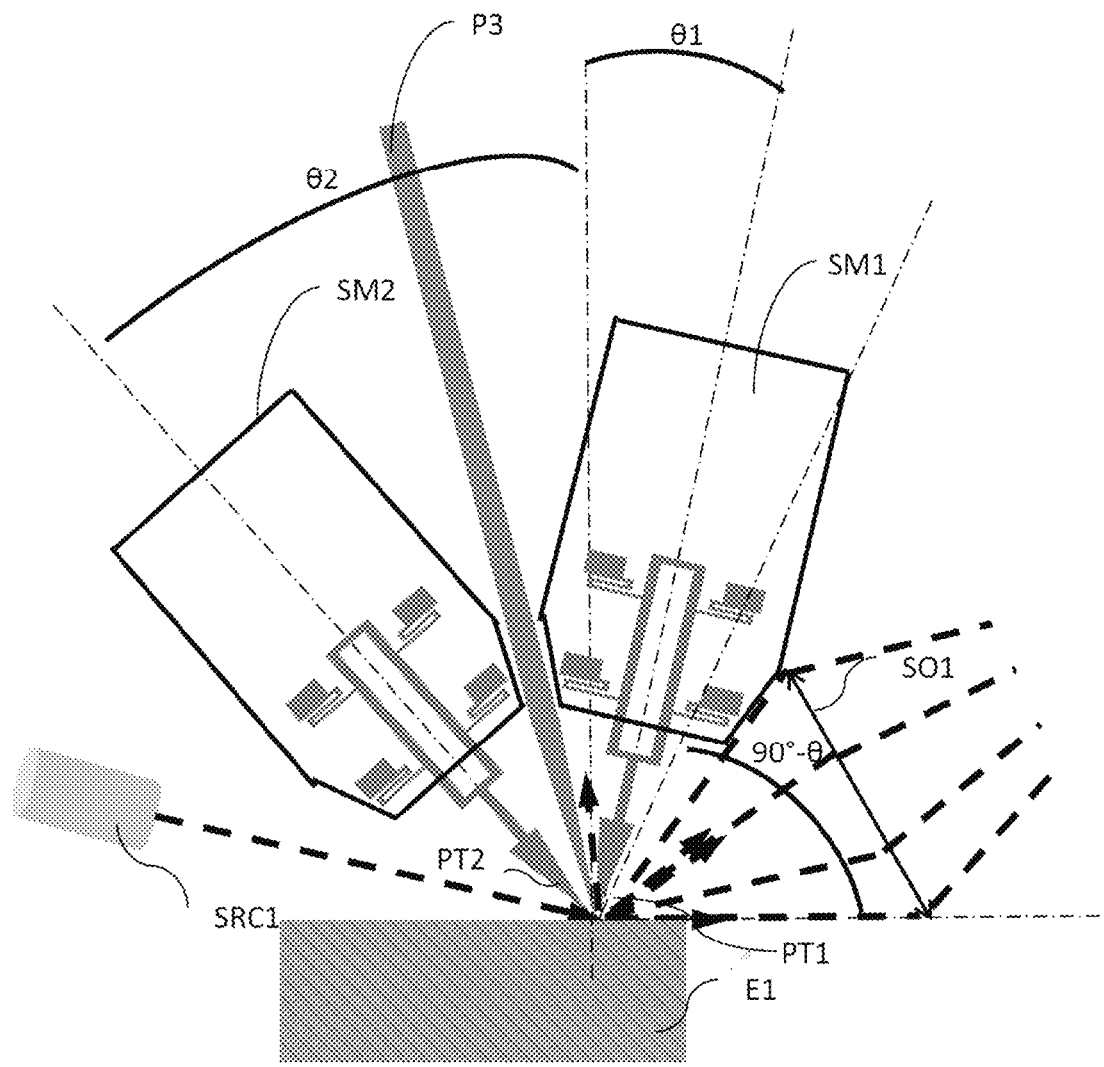
FIG. 17, a view illustrating the combined use of two probes according to one embodiment of the invention, the tips of which are interacting with one and the same region of the surface of a sample, of a light beam illuminating this surface region and of a conductive tip applying an electrical potential thereto.

By virtue of the low bulk of the probes according to the invention, it is possible to produce complex microscopes, opening up prospects that could hitherto not be envisaged. FIG. 17 illustrates, by way of example, an assembly comprising two probes SM1 and SM2 according to the invention, the tips PT1 and PT2 of which interact with one and the same region of the surface of the sample E1, which region is furthermore illuminated by a light beam (for example a laser beam) emitted by a source SRC1, a detection and collection system SO1 collecting the scattered light; in addition a conductive tip P3 touches the surface of the sample in the immediate proximity of PT1 and PT2 (at a distance that is typically smaller than 100 μm, or even 10 μm) in order to apply a DC or AC electrical potential thereto. The tip P3 may be replaced by a tunneling microscopy tip and/or the number of compact AFM probes may be greater than 2. These probes may be distributed by varying both the angles θ and φ; in the example of the figure, the two probes are in one and the same plane and form angles θ1 and θ2 with the normal to the surface of the sample.

Figure 18A:
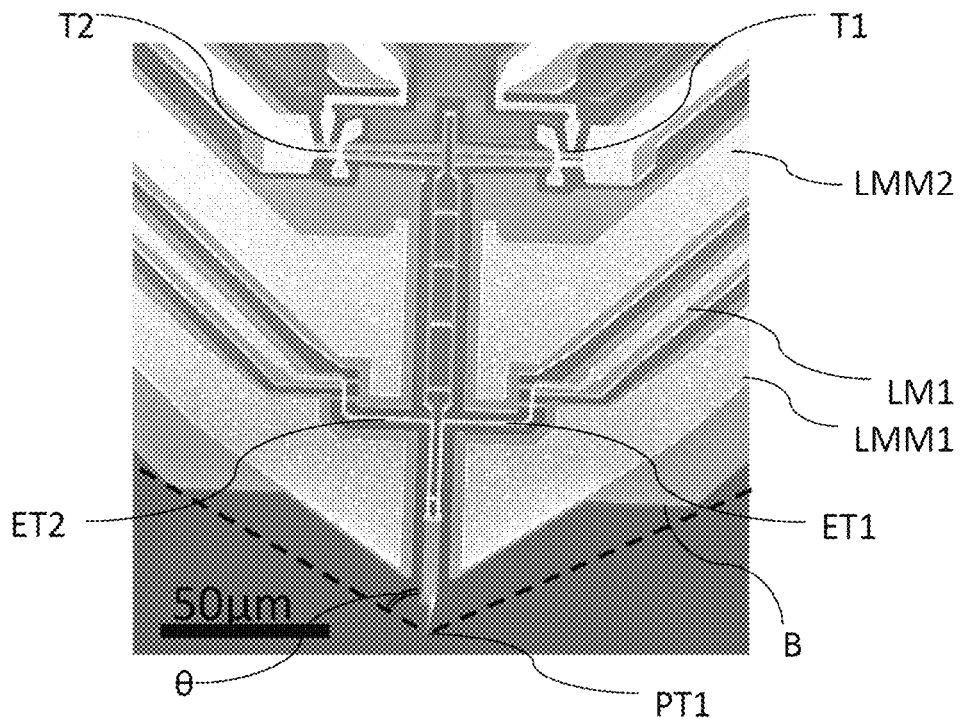
FIG. 18A, an electron microscopy image of a probe according to one embodiment of the invention.
Figure 18B:
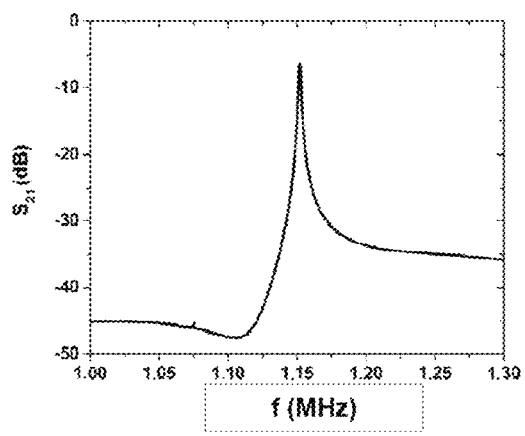
FIG. 18B, the mechanical transfer function of the probe of FIG. 18A.
Figure 18C:
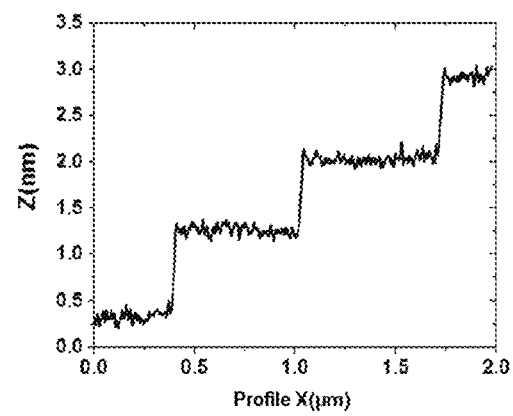
FIGS. 18C and 18D, measurements obtained using the probe of FIG. 18A.

FIG. 18A is an electron microscopy image of an AFM probe according to one embodiment of the invention. In its rear portion (substrate side), this probe comprises two identical resistive transducers T1 and T2, one of which is used as a thermal actuator and the other is used as a piezoresistive sensor. These transducers extend in a transverse direction and also serve as support structures. Other support structures ET1 and ET2, taking the shape of transverse beams, are arranged closer to the tip PT1. The support structures ET1 and ET2 each bear a metal track LM1 that is electrically linked to the tip PT1 in the manner described above with reference to FIG. 2B. Two other metal tracks, LMM1 and LMM2, are arranged on either side of each track LM1, so as to form a planar waveguide structure according to the principle explained above with reference to FIG. 4. The angle θ has a value of 60°; the angle φ, not shown in the figure, has a value of 80° (the tip protrudes from the edge of the substrate by 50 μm, the thickness of which substrate is 300 μm). This probe is therefore indeed a compact probe.

FIG. 1B shows the mechanical transfer function of this probe, measured using an excitation signal having an amplitude of 200 mV with a polarization of the actuation transducer of 3 mA and a polarization of the detection transducer that is also 3 mA. It may be seen that the value of the resonant frequency is 1.16 MHz.

The probe has been used in AM (amplitude modulation) mode to detect the topology of a SiC sample, the surface of which exhibits steps of 750 μm in height and 500 nm in width. The result of this measurement is illustrated in FIG. 1C. The good signal-to-noise ratio is noteworthy.

Figure 18D:
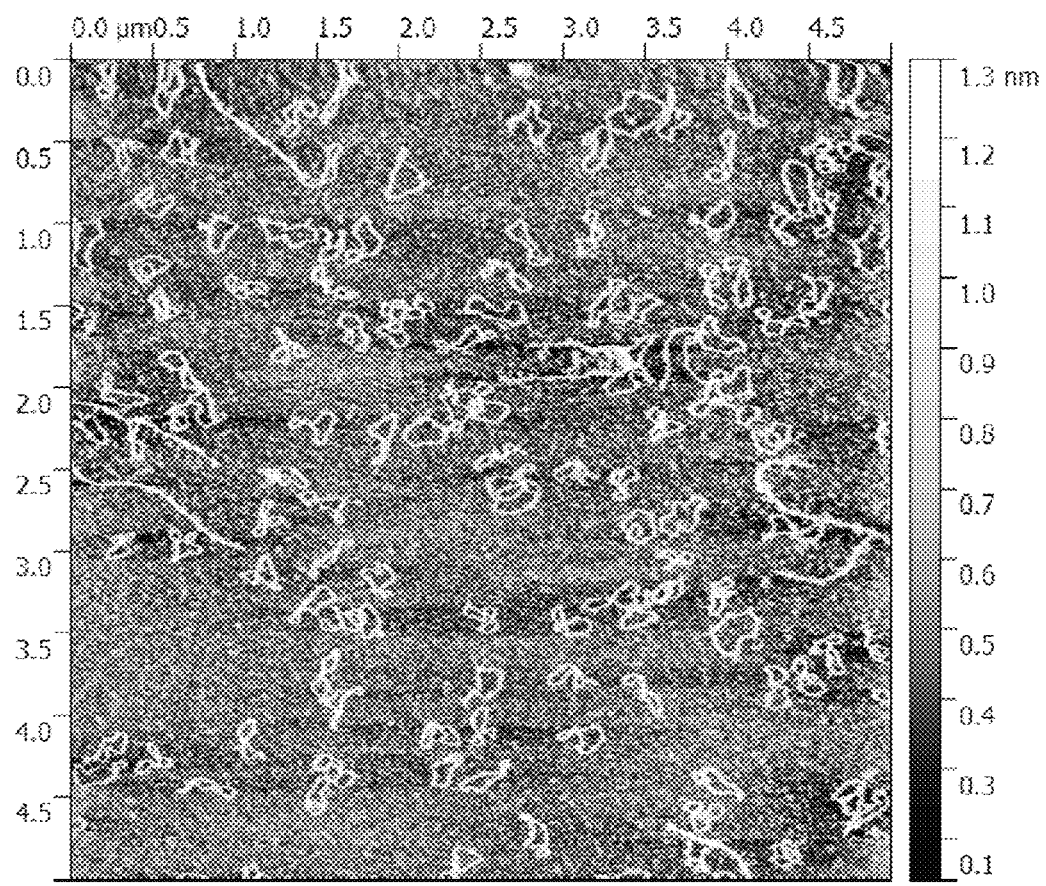

The probe has also been used to acquire an image of circular plasmids on a mica surface. The image, reproduced in FIG. 18D, has been obtained in contactless FM (frequency modulation) mode, with a frequency shift setpoint of 75 Hz.

The invention claimed is:

1. A probe for atomic force microscopy comprising:
   a substrate having an edge;
   a shuttle that is attached to said substrate via a first support structure and a second support structure; and
   a tip for atomic force microscopy that is oriented in a longitudinal direction and protrudes from the edge of the substrate in said longitudinal direction, said tip being arranged at one end of the shuttle, wherein
   said first and second support structures are both anchored to the substrate and are linked to said shuttle at different positions, in said longitudinal direction, of the latter;
   at least said first support structure extends mainly in a transverse direction, perpendicular to said longitudinal direction and is anchored to the substrate by at least one mechanical linkage in said transverse direction, the longitudinal and transverse directions forming a plane that is parallel to a main surface of the substrate,
   said support structures are deformable in the longitudinal direction, allowing the shuttle to be displaced in the longitudinal direction, and
   at least said shuttle and said first and second support structures are located above a surface of said substrate in a direction parallel to the longitudinal and transverse directions.

2. The probe for atomic force microscopy as claimed in claim 1, wherein said second support structure is a micromechanical resonator that is suitable for being excited in order to make said shuttle oscillate in said longitudinal direction.

3. The probe for atomic force microscopy as claimed in claim 2, wherein said micromechanical resonator is chosen from a ring-shaped resonator and at least one beam that is anchored to the substrate by at least one mechanical linkage and is oriented in said transverse direction.

4. The probe for atomic force microscopy as claimed in claim 1, wherein said second support structure is also a flexible structure, extending in said transverse direction and anchored to the substrate by at least one mechanical linkage.

5. The probe for atomic force microscopy as claimed in claim 1, also comprising at least one actuator that is configured to bring about a displacement of said shuttle in said longitudinal direction, causing at least said first support structure to bend.

6. The probe for atomic force microscopy as claimed in claim 1, also comprising at least one actuator that is configured to bring about a displacement of said shuttle mainly in said transverse direction, causing at least one said support structure to bend.

7. The probe for atomic force microscopy as claimed in claim 1, having a monolithic structure and wherein at least said shuttle and said support structures are produced in a surface layer, referred to as the device layer, which is located above a surface of said substrate.

8. The probe for atomic force microscopy as claimed in claim 1, wherein the shape of said shuttle is elongate in said longitudinal direction and protrudes from said edge of the substrate.

9. The probe for atomic force microscopy as claimed in claim 8, wherein said first support structure is at least partly suspended above said edge of the substrate.

10. The probe for atomic force microscopy as claimed in claim 9, wherein said first support structure is attached to the substrate via anchors that are themselves at least partly suspended above said edge of the substrate.

11. The probe for atomic force microscopy as claimed in claim 1, also comprising at least one conductive track linking an interconnect pad, deposited on said substrate, to said tip for atomic force microscopy, by passing through one said support structure and through said shuttle.

12. The probe for atomic force microscopy as claimed in claim 11, also comprising two elements that are positioned on either side of the support structure bearing said conductive track, said elements bearing respective conductive tracks, forming a planar waveguide with the conductive track passing through said support element.

13. The probe for atomic force microscopy as claimed in claim 1, comprising two elongate structures, referred to as lateral beams, extending in said longitudinal direction on either side of the shuttle, wherein both said shuttle and said lateral beams bear conductive tracks forming a planar waveguide.

14. The probe for atomic force microscopy as claimed in claim 1, also including a structure extending beyond said edge of the substrate in a direction that is oblique in the direction of said atomic force microscopy tip, said structure bearing an element chosen from a planar waveguide and a microfluidic channel.

15. The probe for atomic force microscopy as claimed in claim 1, wherein said shuttle bears, in proximity to or in correspondence with said tip for atomic force microscopy, a resistive element, the ends of which are linked to two interconnect pads that are deposited on said substrate by respective conductive tracks passing through said first support structure and through said shuttle.

16. The probe for atomic force microscopy as claimed in claim 1, including a thermo-optical actuator comprising a planar optical guide section that is rigidly connected to said shuttle and extends in said transverse direction, as well as at least one planar optical guide that is arranged on the surface of said substrate and configured to inject light into said planar optical guide section in a generally longitudinal direction.

17. The probe for atomic force microscopy as claimed in claim 1, comprising a motion sensor including a planar optical guide section that is rigidly connected to said shuttle and extends in said transverse direction, as well as two planar optical guides that are arranged on the surface of said substrate and are optically coupled to the opposite ends of said optical guide section, the strength of the coupling depending on the position of the optical guide section in said longitudinal direction.

18. The probe for atomic force microscopy as claimed in claim 1, including a motion sensor including an optical resonator that is rigidly connected to said shuttle, as well as at least one planar optical guide that is rigidly connected to the substrate and coupled by evanescent wave with said optical resonator, the strength of the coupling depending on the position of the shuttle, and hence of the optical resonator, with respect to said planar optical guide, in said longitudinal direction.

19. The probe for atomic force microscopy as claimed in claim 1, wherein the shape of at least one said support structure is elongate with hairpin turns.

20. An atomic force microscope comprising at least one probe as claimed in claim 1.

21. The atomic force microscope as claimed in claim 20, also comprising:
    a light source that is configured to generate a light beam directed toward a region of the surface of a sample that is interacting with the tip for atomic force microscopy of said probe; and
    a system for detecting the light of said beam that is scattered through interaction with the surface of said sample and said tip.

22. The atomic force microscope as claimed in claim 20, also comprising a conductive tip that is arranged to come into contact with a region of the surface of a sample in proximity to the tip for atomic force microscopy of said probe.

* * * * *